United States Patent [19]
Koppolu

[11] Patent Number: 5,706,458
[45] Date of Patent: Jan. 6, 1998

[54] METHOD AND SYSTEM FOR MERGING MENUS OF APPLICATION PROGRAMS

[75] Inventor: Srinivasa R. Koppolu, Redmond, Wash.

[73] Assignee: Microsoft Corporation, Redmond, Wash.

[21] Appl. No.: 611,208

[22] Filed: Mar. 5, 1996

[51] Int. Cl.$^6$ .................................................. G06F 3/00
[52] U.S. Cl. .................................................. 395/353
[58] Field of Search .................................... 395/352, 353

[56] References Cited

U.S. PATENT DOCUMENTS

| | | | |
|---|---|---|---|
| 5,220,675 | 6/1993 | Padawer et al. | 395/800 |
| 5,530,869 | 6/1996 | Salle | 395/700 |
| 5,581,686 | 12/1996 | Koppolu et al. | 395/340 |
| 5,613,058 | 3/1997 | Koppolu et al. | 395/376 |
| 5,634,019 | 5/1997 | Koppolu et al. | 395/335 |

OTHER PUBLICATIONS

Nicolaisen, N., "Easy OLE vetrofit," Windows Sources, Mar. 1995, V.3, N.3, p. 170(3).
Faison, T., "The BoCole engine and OCF class Library make Programming OLE easier," MS Systems J., Mar. '95 V.10, N.3 p. 67(22).
Kraig Brockschmidt, *Inside Ole 2*, Microsoft Press, Redmond, WA, 1994, pp. 843–956 Compound Documents:In–Place Activation.

*Primary Examiner*—Raymond J. Bayerl
*Assistant Examiner*—A. Katbab
*Attorney, Agent, or Firm*—Jones & Askew, LLP

[57] ABSTRACT

A method and system for generating a merged menu list using a conflict resolution protocol. The conflict resolution (CR) protocol includes container menus of a container application and server menus of a server application. The container application has a container object and a container window environment, and the server application has a containee object which is contained within the container object. The CR protocol displays the container window environment and displays the containee object within the displayed container window environment. When the displayed containee object is selected, the CR protocol merges the container menus and the server menus into a merged menu list. In particular, when a container menu corresponds to a server menu, the CR protocol creates a combined menu and adds the combined menu to the merged menu list. Then, the CR protocol adds the container menu as a container sub-menu of the added combined menu in the merged menu list and adds the server menu as a server sub-menu of the added combined menu in the merged menu list. When a container menu does not correspond to any of the server menus, the CR protocol adds the container menu to the merged menu list. When a server menu does not correspond to any of the container menus, the CR protocol adds the server menu to the merged menu list. In addition, the CR protocol displays the merged menu list. When the combined menu is selected from the displayed merged menu list, the CR protocol displays the container sub-menu of the combined menu and the server sub-menu of the combined menu. When the displayed container sub-menu is selected, the CR protocol invokes the container application to process the container sub-menu, and when the server sub-menu is selected, the CR protocol invokes the server application to process the server sub-menu.

21 Claims, 23 Drawing Sheets

Menu Group Count Array

Merged Menu List

METHOD AND SYSTEM FOR MERGING MENUS OF APPLICATION PROGRAMS

TECHNICAL FIELD

This invention relates generally to a computer method and system for merging the menus of application programs and, more specifically, to a method and system for merging the menus of a container application program and a server application program.

BACKGROUND OF THE INVENTION

When a user invokes (starts up) an application program, the application program typically displays a user interface that has a menu list containing menus. The menu list provides the user with options for interacting with the application program. FIG. 1 is an example of a user interface provided by an application program for generating and editing a word processing document. The document is displayed in a window 102. In addition, the user interface includes a menu list 104 with several menus, including a "File" menu 106, an "Edit" menu 108, and a "Help" menu 110. Each of the menus contains menu items. A menu item may be a sub-menu or a command to be executed by the application program. A sub-menu is a menu contained within another menu, and the sub-menu includes menu items. A command typically represents an action that can be performed by an application program, such as printing a document.

When a user selects a menu, the application program displays the menu items in the selected menu. A user may select a menu by using an input device, such as a mouse or a keyboard. When using a mouse, the user may identify a menu by pointing at the menu and then select the menu by depressing a mouse button while continuing to point at the menu. When using a keyboard, a user may select a menu by using "arrow" keys to identify the menu and then by pressing an "enter" key. For example, in FIG. 1, the "Help" menu 110 has been selected. When a user selects the "Help" menu, the application program displays the menu items 112.

FIG. 2 is an example of a user interface provided by the Microsoft Word application program that has generated a document which contains an activated worksheet object 204 created by the Microsoft Excel application program. The document is a compound document which contains data in different formats (i.e., word processing and worksheet). The Microsoft Word application program that generates this compound document is a container application program. The data of each format are referred to as "objects." An application program which generates an object is a server application program. For instance, the document 216 contains a worksheet object 204 which is generated by the server application program. In FIG. 2, a user has selected the worksheet object and specified an operation to be performed on the object, such as displaying the object for viewing (i.e., the user has activated the object).

In one conventional system, when a document contains an object and the object is activated by a user, the container application program's menu list merges with the server application program's menu list to form a merged menu list. In this conventional system, the server application program's "Help" menu is added to the merged menu list and the container application program's "Help" menu is/not added to the merged menu list. For instance, in FIG. 2 the "Help" menu 212 containing the menu items 214 that are provided by the Microsoft Excel application program, rather than the menu items 112 provided by the Microsoft Word application program, is displayed.

However, when an object is activated and a user selects the document, the container application program's menu list is displayed. The "Help" menu in the container application program's menu list contains help information provided by the container application program. FIG. 3 is an example of a user interface provided by the container application program which has generated a document which contains a worksheet object 304. As illustrated by FIG. 3, when a user selects the document generated by a container application program, the "Help" menu 312 containing the menu items 314 that are provided by the container application program is displayed.

FIG. 4 is an example of a user interface provided by a Microsoft Exchange application program. The application program is a container application program which generates a mail document. The mail document is displayed in a window 402. The mail document includes the "To" field 404, the "Cc" field 406, and the "Subject" field 408 which may be edited using the container application program. Additionally, the mail document contains an object 410, which is a Microsoft Word document. Because, in this conventional system, the object is always "activated" in the mail document, the object's "Help" menu 412 is available in the menu list. However, because the object is always activated, the user is not able to access the container application program's "Help" menu.

Many application programs are written in an object-oriented environment that supports compound documents. One such object-oriented environment is Microsoft OLE 2.01 developed by Microsoft Corporation of Redmond. The present invention is described below using some object-oriented techniques; thus, an overview of well-known object-oriented programming techniques is provided.

Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

An advantage of using object-oriented techniques is that these techniques can be used to facilitate the sharing of objects. For example, a program implementing the function members of an instantiated object (a "server application program") can share the object with another program (a "container application program"). For example, a Microsoft Exchange application program may be a container application program which generates a mail document ("a container object"). The container application program may receive an object, such as a word processing document object (a "containee object"), from a Microsoft Word application program, which is a server application program. The containee object is contained in the container object.

To allow an object of an arbitrary class to be shared with a container application program, interfaces are defined through which an object can be accessed without the need for the container application program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a container application program desires to share an object, the container application program needs access to the code that implements the interfaces for the object (the derived class code). To access the derived class code (also referred to as class code), each class implementation is given a unique class identifier (a "CLSID"). For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet application program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the container application program can access the function members of shared spreadsheet objects without regard to which server application program has implemented them or how they have been implemented.

Since an object may support some interfaces and not others, a container application program would need to determine at runtime whether a particular object supports a particular interface. To enable this determination, every object supports the interface IUnknown, which contains a function member, QueryInterface, that indicates which interfaces are implemented for the object. The QueryInterface method is defined as follows:

virtual HRESULT QueryInterface (REFIID iid, void**ppv)=0;

The QueryInterface method is passed an interface identifier in the iid argument (of type REFIID) and returns in the ppv argument a pointer to the implementation of the identified interface of the object for which the method is invoked. If the object does not support the interface, then the method returns a false. The type HRESULT indicates a predefined status.

In one conventional system, an application program that generates a compound document is a container application program. An application program that provides an object to be contained within the compound document is a server application program. The container and server application programs each have associated menu lists. When a containee object contained within a container object is activated, the container application program's menu list merges with the server application program's menu list.

In certain conventional systems, the server application program merges its menu list with the container application program's menu list by requesting that the container application program add container menus to a merged menu list. In these conventional systems, the container application program adds its menus, other than its "Help" menu, to the merged menu list. Then, the server application program adds server menus, including its "Help" menu, to the merged menu list. In these conventional systems, therefore, a user may access help information provided by the server application program when an object is activated. Also, unfortunately in certain conventional systems, a user is not able to select the document provided by the container application program in order to access its "Help" menu, and, therefore, the container application program's "Help" menu is not available to a user when an object is currently activated.

SUMMARY OF THE INVENTION

It is an object of the present invention to provide a method and system for merging menus of application programs.

It is another object of the present invention to provide a method and system for resolving a conflict between corresponding menus while merging menus of a container and a server application program.

These and other objects, which will become apparent as the invention is more fully described below, are provided by a method and system for merging a container menu of a container application program with a server menu of a server application program. In a preferred embodiment, the conflict resolution (CR) protocol determines whether the container menu corresponds to the server menu. When the container menu corresponds to the server menu, the CR protocol generates a combined menu. Next, the CR protocol adds the container menu as a sub-menu of the combined menu and adds the server menu as a sub-menu of the combined menu. The combined menu is then displayed when the server application program is activated. Because the combined menu contains both the container menu and the server menu, a user can select either menu when the server application program is activated.

In one aspect of the present invention, a CR protocol operates in conjunction with a menu merging protocol to merge container menus of a container application program and server menus of a server application program into a merged menu list. The container application program has a container object and a container window environment, and the server application program has a containee object which is contained within the container object. When the container window environment is displayed with the containee object, and the displayed containee object is activated, the container and server menus are merged. The menu merging protocol enables the container application program to add container menus to the merged menu list and enables the server application program to add server menus to the merged menu list. However, when a container menu corresponds to a server menu (e.g., both are "Help" menus), the menu merging protocol, by convention, allows the server application program to add its server menu to the merged menu list but does not allow the container application program to add its corresponding container menu to the merged menu list. Therefore, only the corresponding server menu is available in the merged menu list, and a user cannot select the corresponding container menu when the containee object is activated.

The CR protocol allows both the server menu and its corresponding container menu to be available to a user when the containee object is activated. When both the server and the container application programs support the CR protocol, they cooperate within the menu merging protocol to make available both of their corresponding menus in the merged menu list. In particular, first the server application program requests the container application programs to add container menus to the merged menu list. The container application program adds a combined menu to the merged menu list. By adding the combined menu to the merged menu list, the container application program indicates to the server application program that it supports the CR protocol. Then, the container application program adds a corresponding container menu as a container sub-menu of the combined menu. Next, the container application program adds container menus other than the corresponding container menu to the merged menu list. After the container application program has added its menus to the merged menu list, the server application program determines whether the container application program added a combined menu to the merged menu list. When the container application program has added a combined menu to the merged menu list, the server application program adds a corresponding server menu as a server sub-menu of the added combined menu in the merged menu list. By adding the corresponding server menu to the combined menu, the server application program indicates to the container application program that it supports the CR protocol. Then, the server application program adds server menus other than the corresponding server menu to the merged menu list. Next, the server application program requests the container application program to display the merged menu list. The container application program determines whether the server application program added the corresponding server menu to the combined menu. When the server application program has added a corresponding server menu to the combined menu, the container application program displays the merged menu list. After the merged menu list is displayed, when the combined menu is selected from the displayed merged menu list, the container sub-menu of the combined menu and the server sub-menu of the combined menu are displayed. When the displayed container sub-menu is selected, the container application program is invoked to process the selected container sub-menu. When the displayed server sub-menu is selected, the server application program is invoked to process the selected server sub-menu.

In some instances, only the container application program or only the server application program may support the CR protocol. When only one application program supports the CR protocol, the CR protocol adjusts the merged menu list as necessary and defaults to the menu merging protocol. For instance, when the container application program does not support the CR protocol, it does not add a combined menu to the merged menu list, which indicates to the server application program that the container application program does not support the CR protocol. Then, before adding server menus to the merged menu list, the server application program determines that the container application program has not added a combined menu to the merged menu list, and so the server application program adds its corresponding server menu directly to the merged menu list. Then the container and server application programs interact under the menu merging protocol to display the merged menu list. Conversely, when the container application program supports the CR protocol, but the server application program does not, the container application program removes the combined menu it added to the merged menu list. In particular, before displaying the merged menu list, the container application program determines whether the server application program added the corresponding server menu as a server sub-menu to the combined menu. When it is determined that the server application program has not added a corresponding server menu as a server sub-menu to the combined menu, the container application program removes the combined menu from the merged menu list. Then, the server application program's corresponding server menu is added directly to the merged menu list. After this, the container and server application programs interact under the menu merging protocol to display the merged menu list.

DETAILED DESCRIPTION OF THE INVENTION

Figure 1:
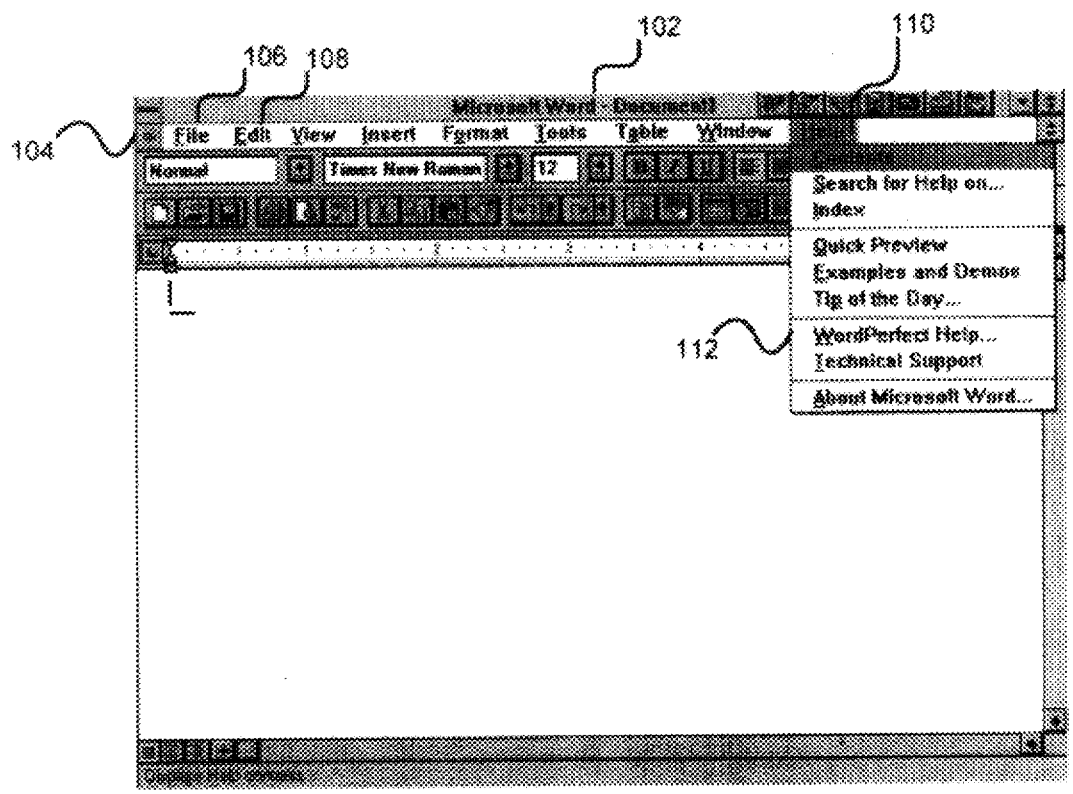
FIG. 1 is an example of a user interface provided by an application program for generating and editing a word processing document.
Figure 2:
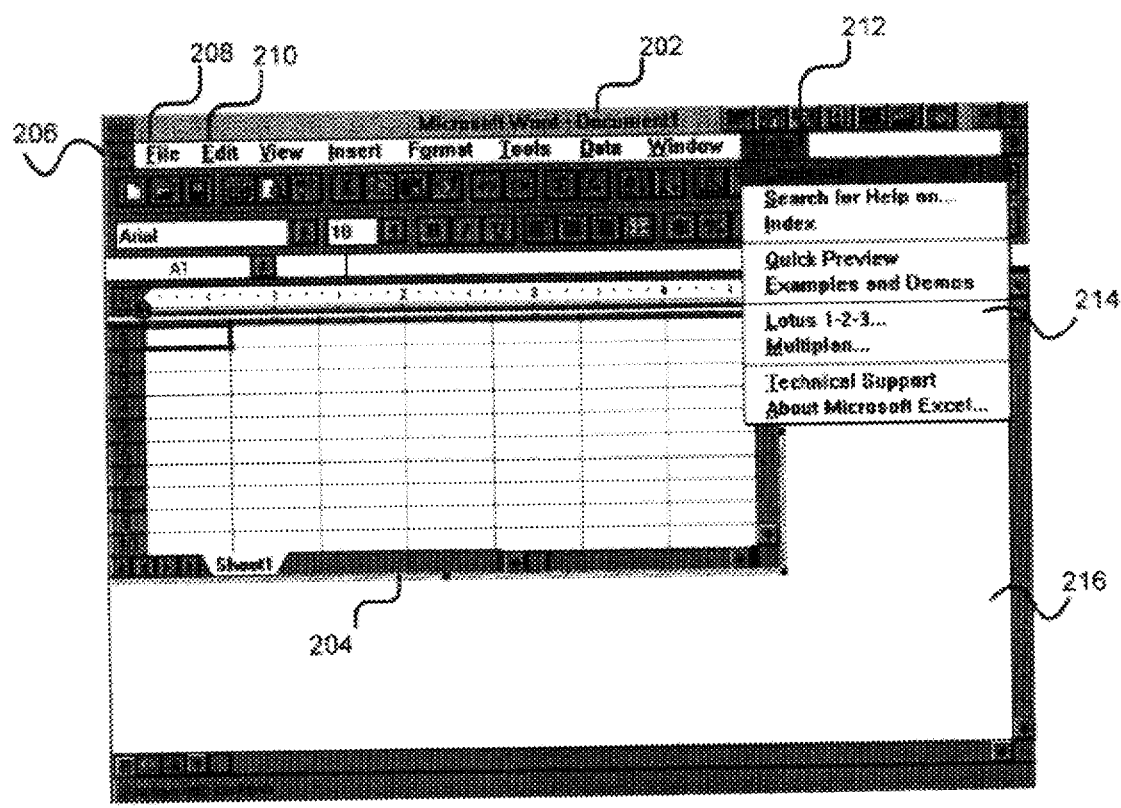
FIG. 2 is an example of a user interface provided by the Microsoft Word application program that has generated a document which contains an activated worksheet object created by the Microsoft Excel application program.
Figure 3:
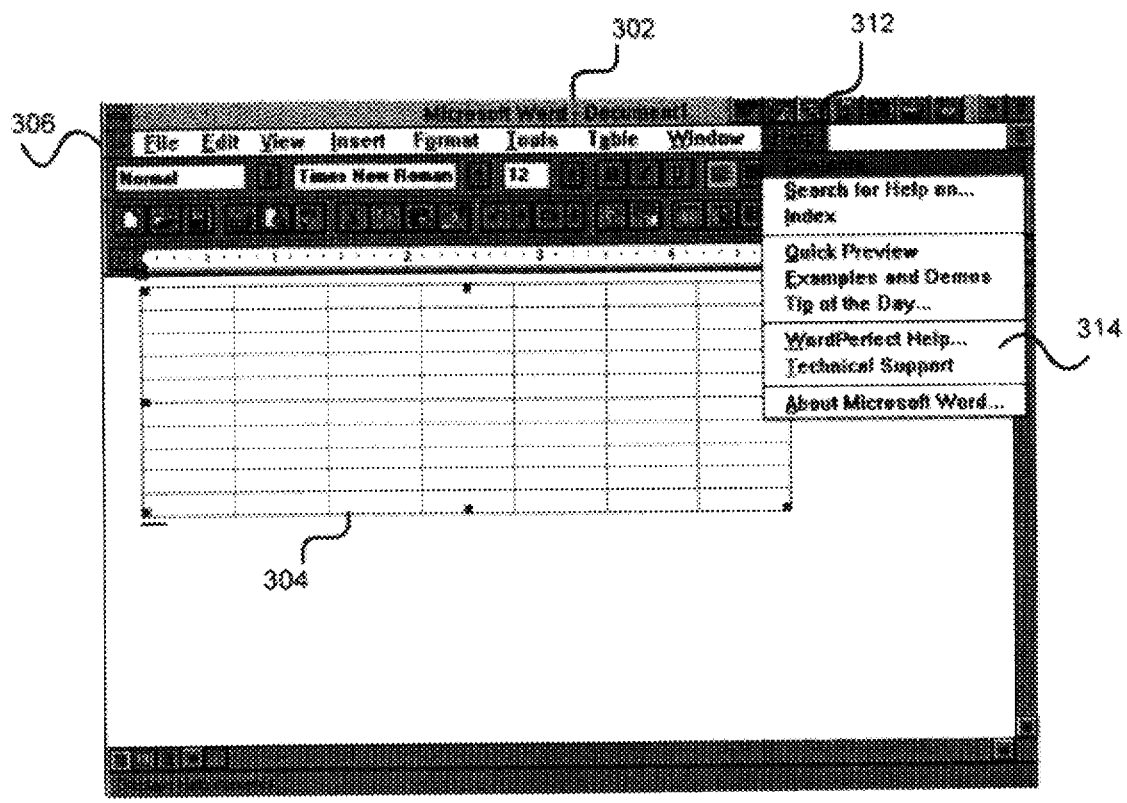
FIG. 3 is an example of a user interface provided by the container application program which has generated a document which contains a worksheet object.
Figure 4:
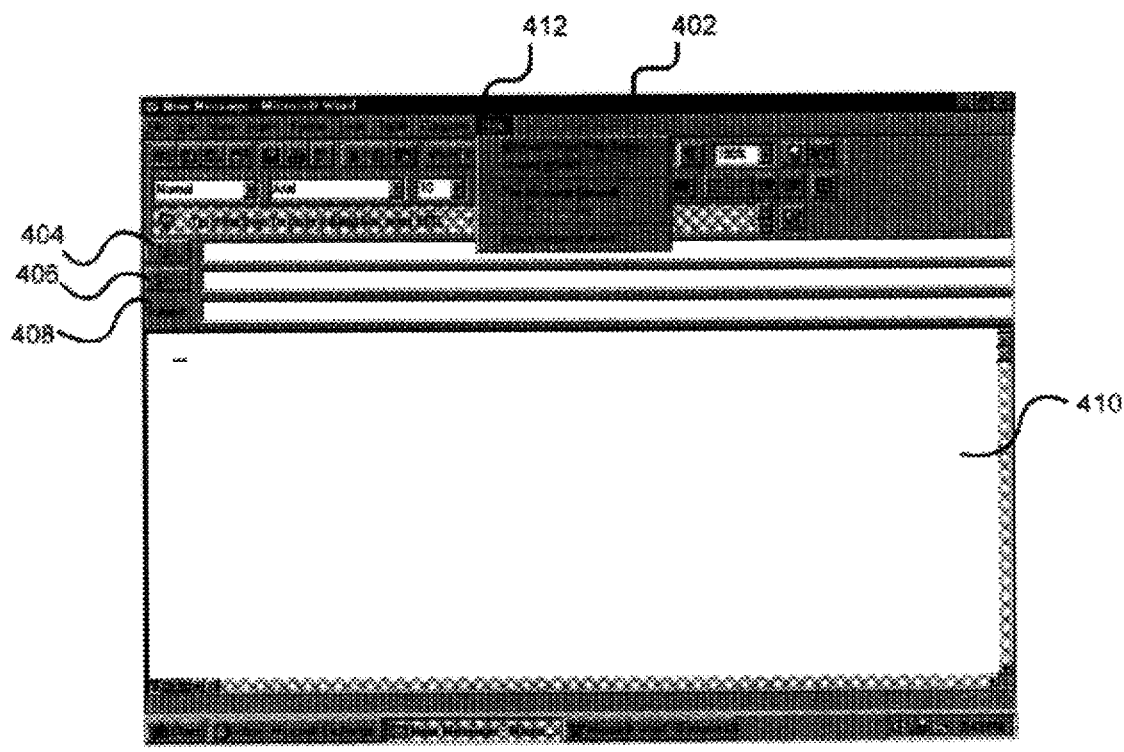
FIG. 4 is an example of a user interface provided by a Microsoft Exchange application program.

The present invention provides a method and system of merging container menus of a container application program and server menus of a server application program to generate a merged menu list. In particular, a conflict resolution (CR) protocol determines whether any of the container menus correspond to (or conflicts with) any of the server menus. When a container menu corresponds to a server menu, the CR protocol generates a combined menu and adds the combined menu to the merged menu list. Then, the CR protocol adds the container menu as a sub-menu of the combined menu and adds the server menu as a sub-menu of the combined menu. Next, the CR protocol adds container menus to the merged menu list which have not been added as container sub-menus. After adding these container menus, the CR protocol adds server menus to the merged menu list which have not been added as server sub-menus. When the merged menu list has been generated, the CR protocol displays the merged menu list.

When a user selects the combined menu, the CR protocol displays a container sub-menu and a server sub-menu. When a user selects the container sub-menu, the CR protocol invokes the container application program to process the container sub-menu. When a user selects a server sub-menu, the CR protocol invokes the server application program to process the server sub-menu. Thus, the corresponding container menu can be selected from the combined menu when the server application program is activated.

For example, the CR protocol may merge the menu list for a Microsoft Exchange application program (i.e., the container application program) and a Microsoft Word application program (i.e., the server application program). The container application program's "Help" menu corresponds to the server application program's "Help" menu, so the CR protocol generates a "Help" combined menu and adds this to the merged menu list. Then, the CR protocol adds the container application program's "Help" menu as a container sub-menu of the "Help" combined menu and the corresponding server menu as a server sub-menu of the "Help" combined menu. Then the CR protocol adds the remaining container menus and server menus to the merged menu list, which includes adding the server application program's "Help" menu as a server sub-menu of the "Help" combined menu. When the merged menu list is displayed, then the "Help" menus of both the container and server application programs are available through the "Help" combined menu.

In a preferred embodiment, the methods and systems of the present invention are designed to operate in an object-oriented environment, such as an environment that supports the Microsoft OLE 2.0 ("OLE") protocol established by Microsoft Corporation in Redmond, Wash. One skilled in the art will also recognize that embodiments of the present invention can be practiced in a non-object-oriented environment as well.

The OLE environment provides a menu merging protocol for merging menus to generate a merged menu list, but the menu merging protocol, by convention, generates a merged menu list which contains a server application program's "Help" menu and not a container application program's "Help" menu. The merged menu list contains six menu groups: the File menu group, Edit menu group, Container menu group, Server menu group (i.e., also called Object menu group), Window menu group, and Help menu group. Each menu group may be empty. By convention, under the menu merging protocol, the container application program adds its menus to the File, Container, and Window menu groups, and the server application program adds its menus to the Edit, Server, and Help menu groups.

In the menu merging protocol, the server application program first requests that the container application program add its menus to a merged menu list. After the container application program adds its menus to the File, Container, and Window menu groups, the server application program adds its menus to the Edit, Server, and Help menu groups. Although the container and server application programs typically both provide "Help" menus, by convention, under the menu merging protocol, only the "Help" menu of the server application program is added to the merged menu list. This convention avoids a conflict that would arise if a container menu and a server menu with the same menu name are both added to the merged menu list.

In particular, the server application program adds its "Help" menu to the Help menu group, and, by convention, under the menu merging protocol, the container application program does not add its "Help" menu to any menu group. Therefore, the container application program's "Help" menu is not available in the merged menu list. After, the container and server application programs have added their menus to the merged menu list, the server application program requests the container application program to display the merged menu list. The container application program then displays the merged menu list. After displaying the merged menu list, the container application program installs dispatching code for the container application program, which processes container menu selections, and installs dispatching code for the server application program, which processes the server menu selections.

The present invention provides a conflict resolution (CR) protocol that allows the "Help" menus of both the container and server application programs to be available in the merged menu list. When both the container and server application programs are developed to support the CR protocol, the container and server application programs cooperate with each other using the current menu merging protocol to add both of their "Help" menus as sub-menus of a "Help" combined menu in the merged menu list. In particular, when both the container and server application programs support the CR protocol, the server application program first requests that the container application program add its menus to the File, Container, and Window menu groups. The container application program adds its menus to these menu groups. Then the container application program also adds a "Help" combined menu to the Help menu group in the merged menu list and adds its "Help" menu as a container sub-menu of the "Help" combined menu. Next, the server application program adds its menus to the merged menu list, adding its "Help" menu as a server sub-menu of the "Help" combined menu. Then, the server application program requests that the container application program display the merged menu list. The container application program displays the merged menu list. After displaying the merged menu list, the container application program installs dispatching code for the container application program, which processes container menu selections, and installs dispatching code for the server application program, which processes the server menu selections. In particular, the dispatching code for the container application program will process the "Help" combined menu selections. That is, when a container "Help" sub-menu is selected, the container application program's dispatching code will process the selection. When a server "Help" sub-menu is selected, the container application program's dispatching code forwards the selection to the server application program's dispatching code for it to process.

When neither the container nor the server application program support the CR protocol, the container and server application programs follow the method provided by the menu merging protocol for merging their menus. When the container application program does not support the CR protocol, but the server application program does support the CR protocol, the container and server application programs' interaction results in following the method of the menu merging protocol. In particular, when the container application program does not support the CR protocol, then the container application program does not add its "Help" menu to the merged menu list, but the server application program does add its "Help" menu to the merged menu list. The results is that the server application program's "Help" menu is available, but the container application program's "Help" menu is not available. When the container application program supports the CR protocol, but the server application program does not support the CR protocol, the container application program appropriately removes the "Help" combined menu from the merged menu list before displaying the merged menu list. In particular, when the container application program does support the CR protocol, the container application program adds a "Help" combined menu to the merged menu list. When the server application program does not support the CR protocol, the server application program adds its "Help" menu directly to the merged menu list. Before displaying the merged menu list, the container application program determines whether the server application has followed the CR protocol. When the server application program has not followed the CR protocol, the container application program removes the "Help" combined menu from the merged menu list and then displays the merged menu list. Otherwise, the container application program displays the merged menu list in which both the container and server application programs' "Help" menus are available.

Figure 5:
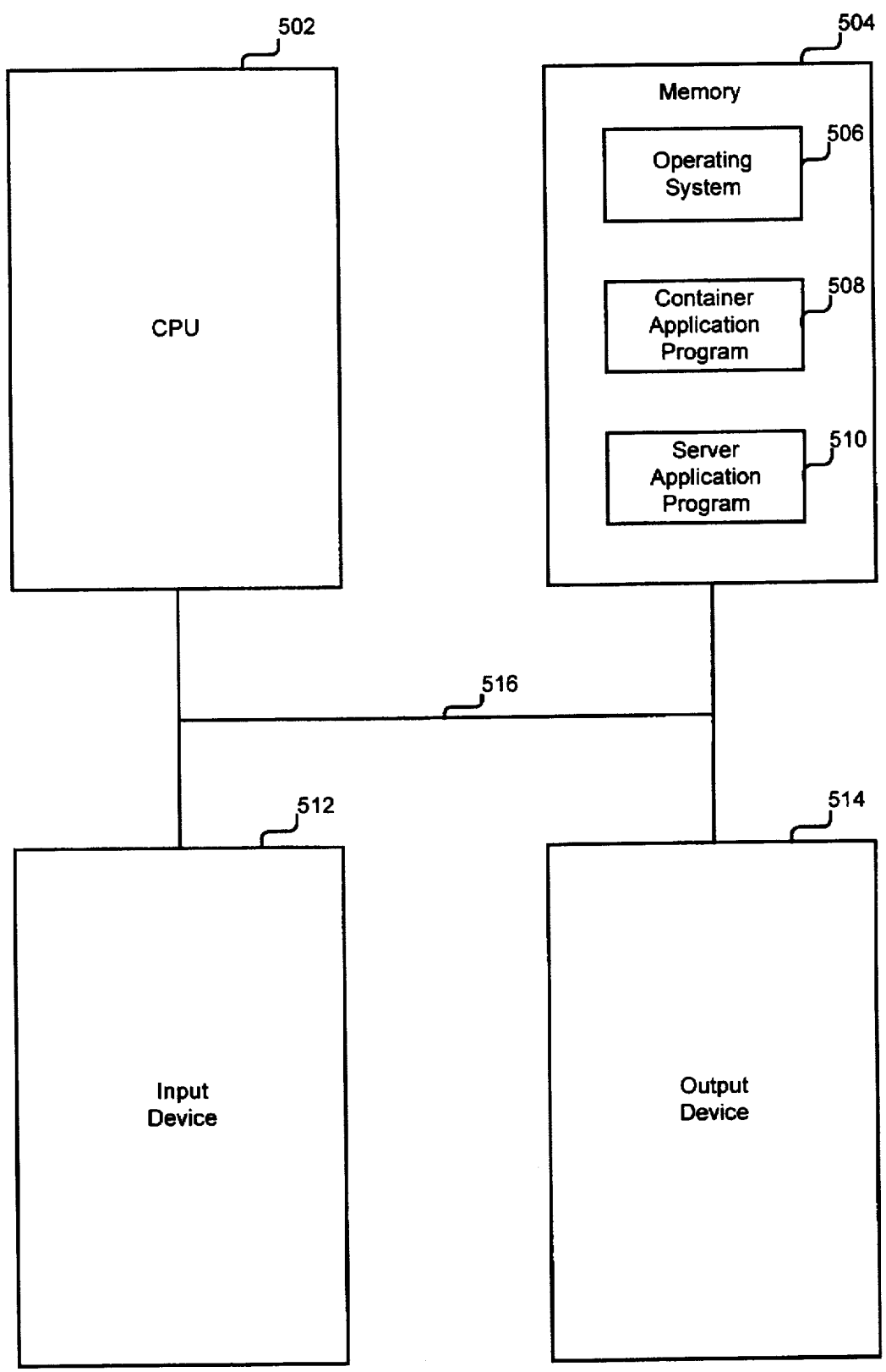
FIG. 5 illustrates an overview diagram of an apparatus for merging menus of application programs.

FIG. 5 illustrates an overview diagram of an apparatus for merging menus of application programs. The computer system contains a CPU 502 and a memory 504. The memory contains an operating system 506, a container application program 508, and a server application program 510. The computer system additionally contains an input device 512, such as a mouse or a keyboard. Moreover, the computer system includes an output device 514, such as a display device. A connection mechanism 516, such as a bus, connects the components of the computer system.

In one embodiment of the present invention, the container application program is a Microsoft Exchange application program and the server application program is a Microsoft Word application program. A Microsoft Word document, which is a containee object, is contained within a Microsoft Exchange document, which is a container object. The containee object is associated with a server application program, and the container object is associated with a container application program. When a user activates a containee object by pointing to it with a mouse and clicking a mouse button, the container application program invokes the server application program to allow a user to edit the containee object. When the server application program is invoked, the server application program merges its server menu list with the container menu list.

In a preferred embodiment of the present invention, application programs are provided with an implementation-independent Application Programming Interface (API) that provides object linking and embedding functionality. The API is a set of functions that are invoked by container and server application programs. These functions manage, among other things, to set up an initialization necessary for container applications to send and receive messages and data to and from server applications. The API provides functions to invoke server applications to manipulate containee objects. A discussion of interaction with contained objects is provided by U.S. patent application Ser. No. 08/229,264, now U.S. Pat. No. 5,613,058, entitled "Method and System For In-Place Interaction With Embedded Objects," which was filed on Apr. 15, 1994, and which is hereby incorporated by reference.

In addition to providing a set of functions, the object linking and embedding ("OLE") API defines "interfaces" through which container application programs can communicate with their contained objects. An interface is a set of methods (in C++ parlance) which abide by certain input, output and behavior rules. If a contained object supports a particular interface, the container application can invoke methods of that interface to affect the defined behavior. In a preferred embodiment, the container application program does not directly access the object data. Rather, it preferably accesses the object data using the supported interfaces. The container application program is bound to a contained object through a pointer to an interface. The container application program accesses the object by invoking the methods of the interface. To access the object data, the methods may send messages to the server application program requesting the specified access. In a preferred embodiment, messages are sent between container and server application programs when the server application program is implemented as a separate process using interprocess communication mechanisms provided by the underlying operating system.

In a preferred embodiment of the present invention, the method is practiced in a window environment, such as one similar to the Microsoft Windows 3.1 Operating System ("Windows"), although one skilled in the art will appreciate that the present invention can be implemented in a different underlying window system. The Microsoft Windows 3.1 Operating System is described in "Programmer's Reference, Volume 2: Functions," Microsoft Corporation, 1992; "Programmer's Reference, Volume 3: Messages, Structures, and Macros," Microsoft Corporation, 1992; and "Guide to Programming," Microsoft Corporation, 1992, which are herein incorporated by reference.

The user interface provided for the application program is logically divisible into a number of windows. In general, each window of the user interface has a separate window procedure associated with it. The operating system maintains a message queue for each application program that creates a window. Since an application program may generate multiple windows, the message queue may hold messages for multiple windows.

When an event occurs, the operating system translates the event into a message that is put into the message queue for the application program. An event may be a mouse movement or keyboard input. The application program retrieves and delivers the message to the proper window by executing a block code known as the "message loop." The window procedure that receives the message then processes the message. Movements of the mouse are reflected in messages that are placed into the message queue of the application program. In particular, when a user positions the mouse cursor with the mouse over a window or clicks the mouse by depressing one of the mouse buttons within a window, the procedure for the window receives a mouse message.

The operating system provides a number of predefined mouse messages. The mouse messages specify the status of mouse buttons and the position of the mouse cursor within the window. The position of the mouse cursor within the window is specified in (X,Y) coordinates relative to the upper left-hand corner of the window. Thus, when the mouse cursor moves within the merged menu list, the position of the mouse cursor within the merged menu list is reflected the mouse message that specifies (X,Y) coordinates of the mouse cursor relative to the upper left-hand corner of the window in which the merged menu list is displayed. The window procedure receives the mouse message and utilizes the information contained in the message to respond to the mouse activities. For example, if a user selects a menu by pointing at a menu with a pointing device, such as a mouse, and clicking a mouse button, the event is translated into a mouse message, which is placed in a message queue for the appropriate window.

Menu Merging Protocol

In the menu merging protocol, the server application program merges its menu list with the container application program's menu list to generate a merged menu list. However, in the menu merging protocol, the server application program adds its "Help" menu to the merged menu list and the container application program does not add its "Help" menu to the merged menu list. In particular, the server application program requests that the container application program add its container menus to a merged menu list. The container application program adds its container menus to the merged menu list, except that the container application program does not add its "Help" menu to the merged menu list. After the container application program has added its menus, the server application program adds its menus to the merged menu list. In particular, the server application program adds its "Help" menu to the Help menu group, and the container application program does not add its "Help" menu to any menu group. Therefore, the container application program's "Help" menu is not available in the merged menu list. After generating a merged menu list, the server application program requests the container to display the merged menu list. The container application program displays the merged menu list and also installs dispatching code for both the container and server application programs.

In a preferred embodiment, the container and server menus are interleaved in the final merged menu list, according to the Microsoft application user interface style guidelines, which is specified in "The Windows Interface: An Application Design Guide," Microsoft Corporation, 1992, which is herein incorporated by reference. The merged menu list is displayed as a merged menu bar, with the menus following the ordering of the menu groups. Specifically, the menu groups in the merged menu bar are typically arranged left to right in the following order: File, Edit, Container, Server, Window, and Help.

Figure 6:
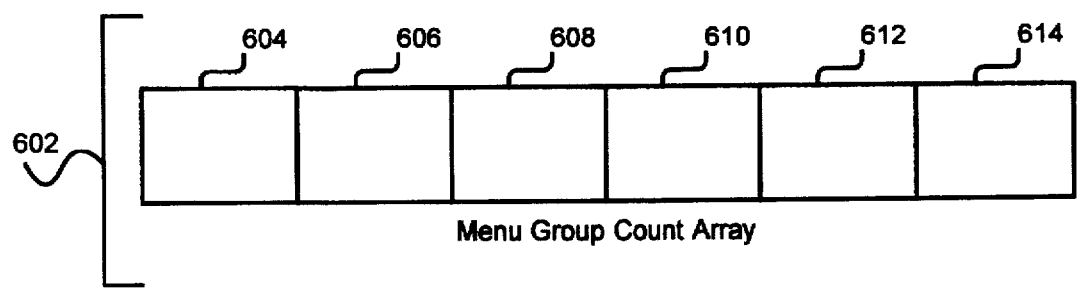
FIG. 6 illustrates a menu group count array.

The server application program uses an empty merged menu list and a menu group count array to generate a final merged menu list. FIG. 6 illustrates a menu group count array. The menu group count array has six entries, numbered zero to five. Each entry of a menu group count array corresponds to a menu group. The first entry 604 corresponds to the File menu group, the second entry 606 corresponds to the Edit menu group, the third entry 608 corresponds to the Container menu group, the fourth entry 610 corresponds to the Server menu group, the fifth entry 612 corresponds to the Window menu group, and the sixth entry 614 corresponds to the Help menu group. The container application program fills in the first, third, and fifth entries, and the server application program fills in the second, fourth, and sixth entries. When a container or server application program adds menus to a menu group, each then adds the number of menus inserted for that menu group into the appropriate entry of the menu group count array corresponding to that menu group.

Figure 7:
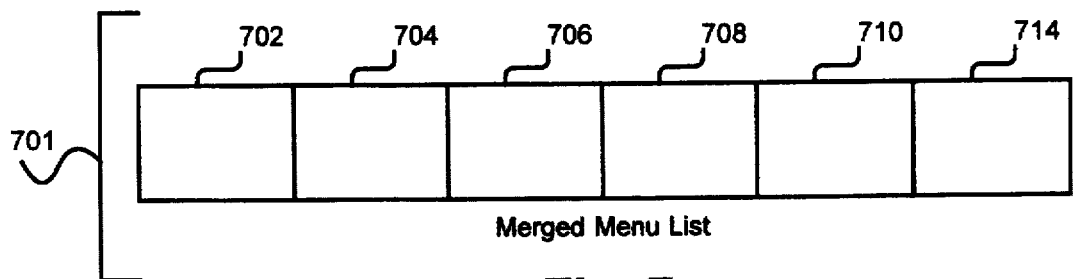
FIG. 7 illustrates a merged menu list.
Figure 18:
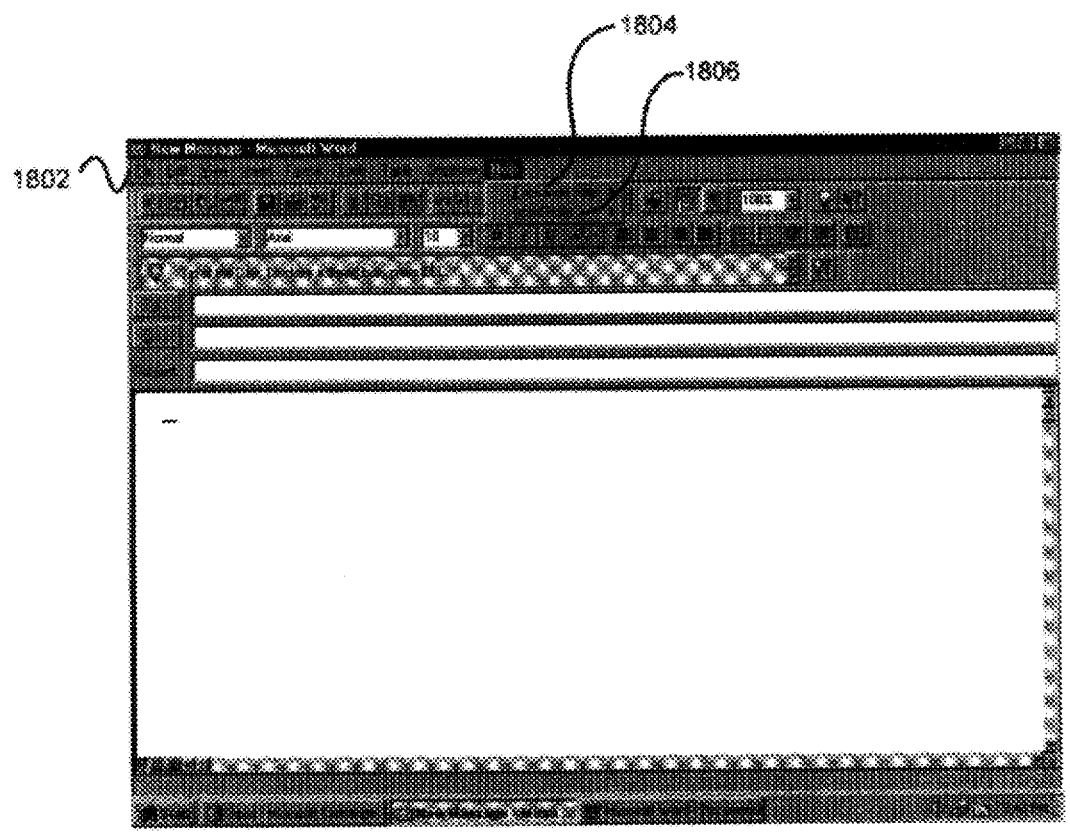
FIG. 18 illustrates a user interface provided by a Microsoft Exchange application program which shows a merged menu list with a "Help" combined menu selected.

FIG. 7 illustrates a merged menu list. The container application program first places its menus into the File menu group 702, the Container menu group 706, and the Window menu group 710. The server application program then places its menus into the Edit menu group 704, the Server menu group 708, and the Help menu group 714. A merged menu list 1802, illustrated in FIG. 18, shows menus within these menu groups. The menus for each menu group are inserted into the correct position in the merged menu list by calculating how many menus have been added into the menu groups prior to that menu group. For example, when the server application program places menus into the Edit menu group, the server application program first determines how many menus were added into the File menu group and then positions its menus accordingly. The entries in the list are adjusted as menus are added, so that the entries for the six menu groups follow the ordering of the menu groups.

FIGS. 8 to 12 illustrate the process of generating a merged menu list. The server application program first calls the InsertMenus method of the IOleInPlaceFrame interface, which is supported by the container application program. The following is the definition of the InsertMenus method:

TABLE 1

| HRESULT IOleInPlaceFrame::InsertMenus(hmenu, lpMenuWidths) | | |
|---|---|---|
| Argument | Type | Description |
| hmenu | HMENU | A handle to an empty menu. |
| lpMenuWidths | LPOLEMENUGROUPWIDTHS | A pointer to an array of 6 LONG values, where the container application program will store the number of menus in menu groups 0, 2 and 4. |
| return value | HRESULT | Returns S_OK if successful, or other values indicating RPC failures or Windows API failures. |

The server application program calls the InsertMenus method to ask the container application program to add its menus to the merged menu list, which is identified by the hmenu argument. The merged menu list is initially empty. The server application program also provides the container application program with a pointer to a menu group count array using the lpMenuWidths argument. Initially, the array contains zeroes. When the InsertMenus method is successful, it returns an S_OK code in the return value argument. Similarly, the InsertMenus method returns other codes to indicate that it was not successful.

Figure 8:
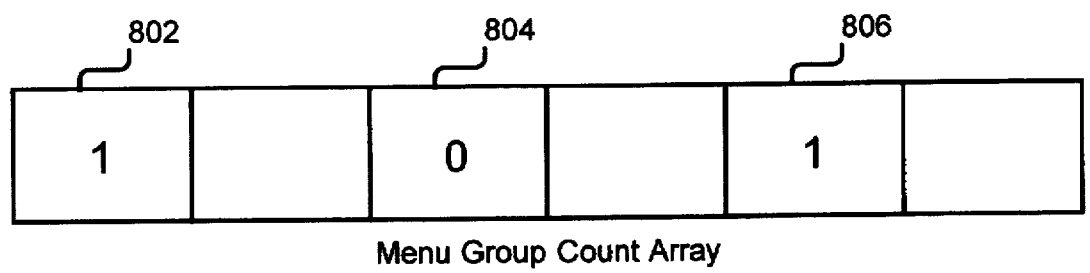
FIG. 8 illustrates a menu group count array after the container application program has updated the menu group count array under the menu merging protocol.
Figure 9:
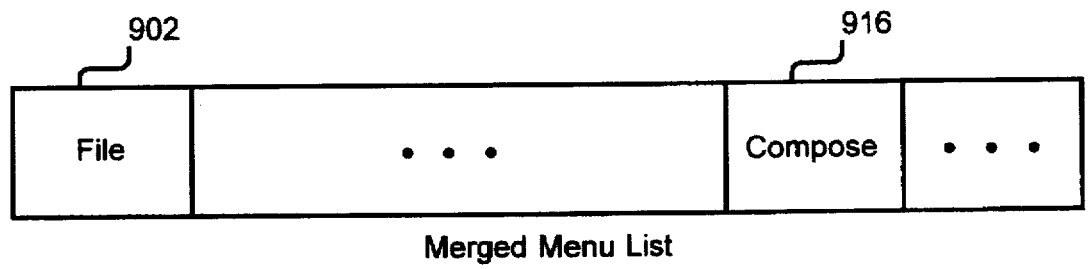
FIG. 9 illustrates a merged menu list after the container application program has added its container menus to its menu groups in the merged menu list under the menu merging protocol.

The container application program then adds its container menus into the merged menu list and adds entries corresponding to the container menus into the menu group count array. FIG. 8 illustrates the menu group count array after the container application program has added its container menus to the merged menu list and updated the menu group count array. FIG. 9 illustrates the merged menu list after the container application program has added its container menus to its menu groups in the merged menu list. First, the container application program places its "File" menu 902 into its File menu group. Then the container application program places a one in the first entry 802 of the menu group count array, indicating that it has added one menu to its File menu group. Second, in this example, the container application program does not place any menus into its Container menu group. Then the container application program enters zero in the third entry 804 in the menu group count array, indicating that it had added no menus to its Container menu group. Third, the container application program places its "Compose" menu 916 into its Windows menu group. Then the container application program adds one in the fifth entry 806 in the menu group count array, indicating that it has added one menu to its Window menu group. The last entry in the menu group count array, which corresponds to the server application program's "Help" menu group, is empty, indicating that the container application program did not add its "Help" menu to the merged menu list.

Figure 10:
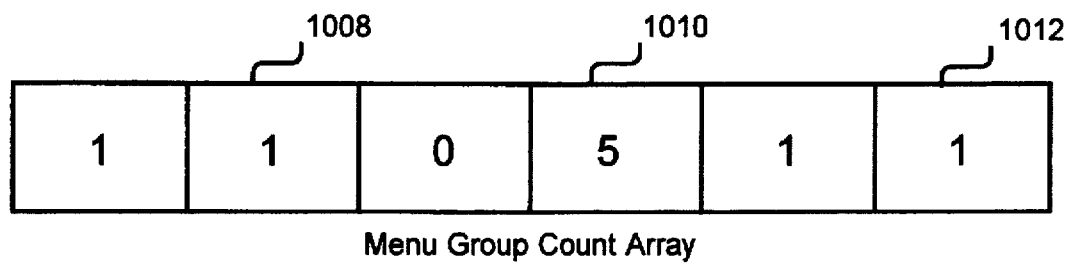
FIG. 10 illustrates a menu group count array after the server application program has updated the menu group count array under the menu merging protocol.
Figure 11:
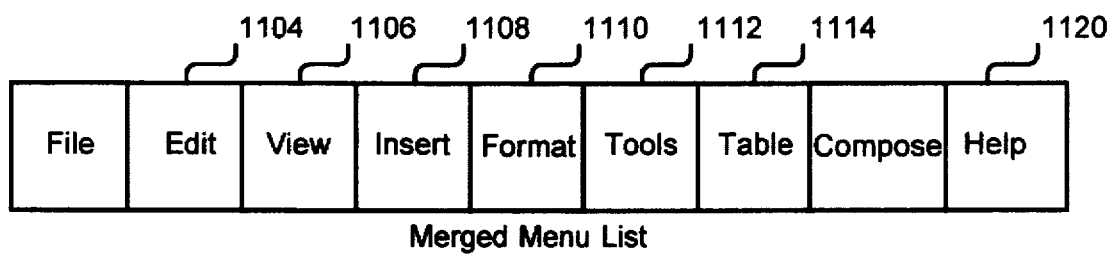
FIG. 11 illustrates a merged menu list after the server application program has added its server menus to its menu groups in the merged menu list under the menu merging protocol.

Then the server application program inserts its server menus into the merged menu list and appropriately fills out the menu group count array. FIG. 10 illustrates a menu group count array after the server application program has added its server menus to the merged menu list and updated the menu group count array. FIG. 11 illustrates a merged menu list after the server application program has added its server menus to its menu groups in the merged menu list. First, the server application program adds an "Edit" menu 1104 to the merged menu list. Then the server application program adds a one in the second entry 1008 of the menu group count array, indicating that it has added one menu to its Edit menu group. Second, the server application program inserts a "View" menu 1106, an "Insert" menu 1108, a "Format" menu 1110, a "Tools" menu 1112, and a "Table" menu 1114 into its Server menu group in the merged menu list. Then the server application program enters a five in the fourth entry 1010 of the menu group count array, indicating that it has added five menus into its Server menu group. Third the server application program adds a "Help" menu 1120 into its Help menu group. Then the server application program then adds a one in the sixth entry 1012 of the menu group count array indicating that it has added one menu to its Help menu group. At this point, the server application program has generated the merged menu list.

Next, the server application program generates a descriptor, which is a data structure used by the operating system to determine whether to send window messages to the container application program's window procedure or to the server application program's window procedure. To generate the descriptor, the server application program calls the OleCreateMenuDescriptor API, which is provided by the OLE environment. The OleCreateMenuDescriptor API is defined by the following:

TABLE 2

| HOLEMENU OleCreateMenuDescriptor(hmenuCombined, lpMenuWidths) | | |
|---|---|---|
| Argument | Type | Description |
| hmenuCombined | HMENU | The handle to the merged menu list created by the server application program. |
| lpMenuWidths | LPOLEMENUGROUPWIDTHS | A pointer to an array of six LONG values giving the number of menus in each group. |
| return value | HOLEMENU | The handle to the descriptor, or NULL if insufficient memory is available. |

Figure 12:
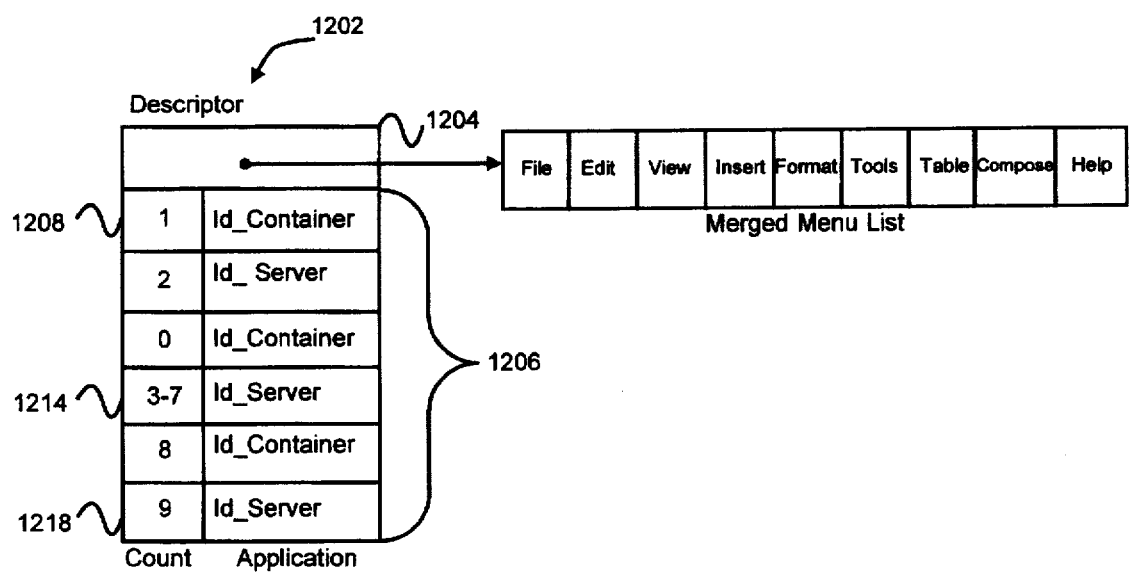
FIG. 12 illustrates a descriptor generated from the menu group count array of FIG. 10 and the merged menu list of FIG. 11.

The server application program calls the OleCreateMenuDescriptor API to create a descriptor for the merged menu list. After the merged menu list has been generated and displayed, if a user selects a menu, the operating system uses the descriptor to dispatch menu messages and commands to the appropriate window procedure. The OleCreateMenuDescriptor API generates the descriptor from a merged menu list, identified by the handle provided in the hmenuCombined argument, and a menu group count array, identified by the lpMenuwidths argument. FIG. 12 illustrates a descriptor generated from the merged menu list illustrated in FIG. 11 and the menu group count array illustrated in FIG. 10. The descriptor has a handle to the merged menu list 1204. The descriptor also contains six entries 1206 which correspond to the menu groups. Each of these entries contains a count field and an application identifier field. The count field indicates the number of the last menu contained in the menu group associated with that entry. (The menus are numbered from one on the left in the merged menu list.) Also, the application identifier field indicates whether the menus in that menu group are processed by the container or server application programs' window procedures. The OleCreateMenuDescriptor API returns the handle to the descriptor if it is successfully generated or NULL if the descriptor was not successfully generated.

successful, then the SetMenu method returns an S_OK code in the return value argument, otherwise the SetMenu method returns other codes indicating it was not successful. The SetMenu method uses the handle to the merged menu list to display the merged menu list. Then, the SetMenu method calls the OleSetMenuDescriptor method to set the correct dispatching code for the operating system. The OleSetMenuDescriptor method, which is provided by the OLE environment, is defined as follows:

TABLE 4

HRESULT OleSetMenuDescriptor (holemenu, hwndFrame, hwndActiveObject, lpFrame, lpActiveObject);

| Argument | Type | Description |
| --- | --- | --- |
| holemenu | HOLEMENU | The handle to the descriptor that was returned by OleCreateMenuDescriptor. |
| hwndFrame | HWND | The handle to the container application program's window where the menu is installed |
| hwndActiveObject | HWND | The handle to the server application program's window. |
| lpFrame | IOleInPlaceFrame FAR * | A pointer to the container application program's interface |
| lpActiveObject | IOleInPlaceActiveObject FAR * | A pointer to the server application program's interface |
| return value | HRESULT | Returns S_OK if the menu was installed correctly and E_FAIL if a Windows function call failed |

For example, the first entry 1208 indicates that one menu is contained in the first menu group and that it is associated with the container application program. Also, entry 1214 indicates that five menus are contained in the fourth menu group and that the menus numbered 3 through 7 in the merged menu list are associated with the server application program. Also, entry 1218 indicates that the last menu of the merged menu list, which is the "Help" menu, is associated with the server application program.

Next, the server application program calls the SetMenu method of the IOleInPlaceFrame interface, which is supported by the container application program. The SetMenu method is defined below:

TABLE 3

HRESULT IOleInPlaceFrame::SetMenu(hmenu,holemenu,hwndObject)

| Argument | Type | Description |
| --- | --- | --- |
| hmenu | HMENU | A handle to the merged menu list |
| holemenu | HOLEMENU | A handle to the descriptor returned by OleCreateMenuDescriptor. |
| hwndObject | HWND | A handle to a window owned by the server application program and to which menu messages and commands and accelerators will be sent. |
| return value | HRESULT | Returns S_OK if successful, or other values indicating RPC failures or Windows API failures. |

The server application program calls the SetMenu method in order to have the container application program install the merged menu list. The server application program passes the handle to the merged menu list with the hmenu argument and a handle to the descriptor with the holemenu argument to the SetMenu method. The server application program also passes to the SetMenu method a handle to the server application program's window. If the SetMenu method is The SetMenu method of the container application program calls the OleSetMenuDescriptor method to install the dispatching code for the container application program, which processes any window messages received by the container application program and dispatching code for the server application program, which processes any window messages received by the server application program's window procedure. That is, the SetMenu method provides the operating system with pointers to the container and server application programs' window procedures. After the merged menu list has been generated, when a user selects a menu, the operating system uses the descriptor to determine whether a menu is associated with the container or server application programs' window procedure. Next, the operating system forwards the message indicating the menu selection to the container or server application programs' dispatching code as appropriate, which have been installed by the OleSetMenuDescriptor method. In particular, the SetMenu method of the container application program passes to the OleSetMenuDescriptor method a handle to the descriptor in the holemenu argument. The SetMenu method also passes a handle to the container application program's window with the hwndFrame argument. The OleSetMenuDescriptor method installs the dispatching code for this window. The SetMenu method also passes a handle to the server application program's window so that the operating system can access the server application program's window procedure. The lpFrame argument and the lpActiveObject argument provide pointers to interfaces which the OleSetMenuDescriptor method uses to appropriately set the dispatching code.

After the dispatching code is installed, when a user selects a menu item, the operating system uses the descriptor to determine whether the container or server application program's window procedure is to process the selected menu item. In particular, the operating system determines which entry a particular menu item selection falls in by counting the number of menus up to and including the menu selection, and then comparing this number with the value in the descriptor count field to find the correct entry. Once the entry has been determined, the operating system retrieves the value in the application identifier field to determine whether a container or server application program's window procedure should receive messages corresponding to that menu. For example, if the "Insert" menu were selected, then the operating system would determine that it is the fourth menu in the merged menu list. Then the operating system would look through the count fields in the descriptor and determine that the value in the count field for entry 1214 includes four for the fourth menu and that it is associated with the server application program's window procedure. Then the operating system sends the menu messages for the "Insert" menu to the server application program's window procedure.

Conflict Resolution Protocol

In the above described menu merging protocol, the container application program's "Help" menu is not available when the merged menu list is generated. Instead, in the menu merging protocol, only the server application program's "Help" menu is available. A preferred embodiment of the present invention provides a conflict resolution (CR) protocol for generating a merged menu list in which both the container and server application programs' "Help" menus are available. In the CR protocol, the server application program first requests that the container application program add its menus to the File, Container, and Window menu groups. After adding its menus, the container application program also adds its "Help" menu to the merged menu list as a container sub-menu of a "Help" combined menu and adds a one to the last entry of the menu group count array. This indicates to the server application program that the container application program supports the CR protocol. Then, the server application program adds its menus to the merged menu list, adding its "Help" menu as a server sub-menu of the "Help" combined menu. Furthermore, through the CR protocol, the container application program and the server application program both make their "Help" menus available in the merged menu list without modifying the menu merging protocol currently in place. When either or both the container or server application program does not support the CR protocol, the CR protocol adjusts the merged menu list as needed and defaults to the menu merging protocol to produce a merged menu list which contains the server application program's "Help" menu and not the container application program's "Help" menu.

In one embodiment of the present invention, the server application program calls the InsertMenus method of the IOleInPlaceFrame interface, with a menu group count array and a merged menu list which is empty. The container application program then adds its menus to its menu groups. Additionally, the container application program adds a "Help" combined menu to the merged menu list. Then the container application program adds its "Help" menu as a container sub-menu of the "Help" combined menu.

Figure 13:
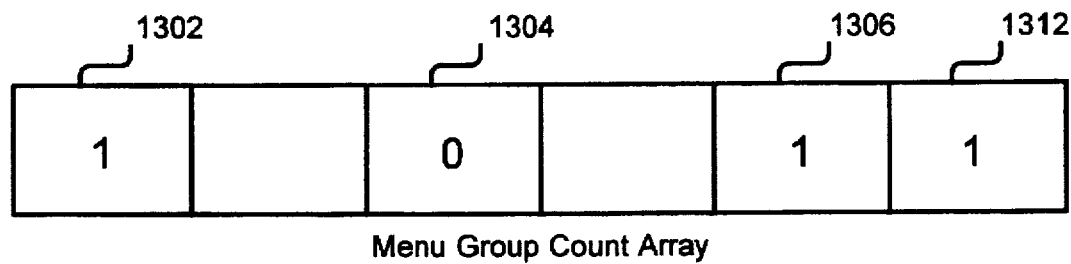
FIG. 13 illustrates the menu group count array after the container application program has updated the menu group count array under the conflict resolution protocol.
Figure 14:
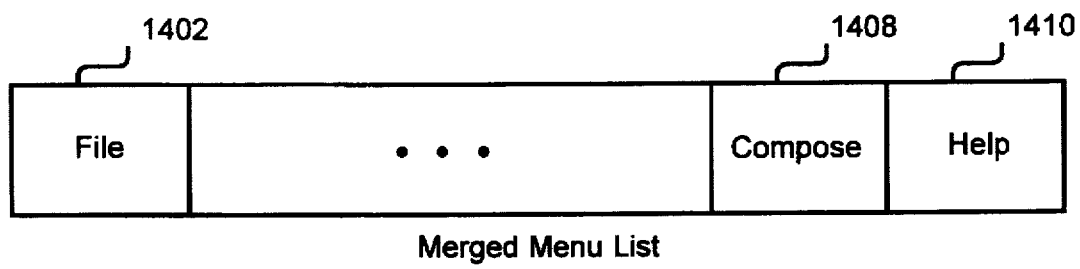
FIG. 14 illustrates the merged menu list after the container application program has placed its container menus into the merged menu list under the conflict resolution protocol.

FIG. 13 illustrates the menu group count array after the container application program has updated the menu group count array. FIG. 14 illustrates the merged menu list after the container application program has placed its container menus into the merged menu list. The container application program has added a "File" menu 1402 to its File menu group and added one into the first entry 1302 of the menu group count array. In addition, the container application program has added no menus to its Container menu group and has added zero into the third entry 1304 of the menu group count array. Also, the container application program has added a "Compose" menu 1408 to its Window menu group and added one into the fifth entry 1306 of the menu group count array. Moreover, the container application program has added a "Help" combined menu 1410 to the merged menu list. In the menu merging protocol, the server application program adds its "Help" menu to the merged menu list. By adding a "Help" combined menu, the container application program indicates that it supports the CR protocol. The container application program has included its own "Help" menu as a container sub-menu of the "Help" combined menu. In particular, the container application program has added a one to the last entry 1312 of the menu group count array, which is typically associated with the server application program. The one in the last entry of the menu group count array indicates to the server application program that the container application program has added its "Help" menu as a container sub-menu of a "Help" combined menu.

Figure 15:
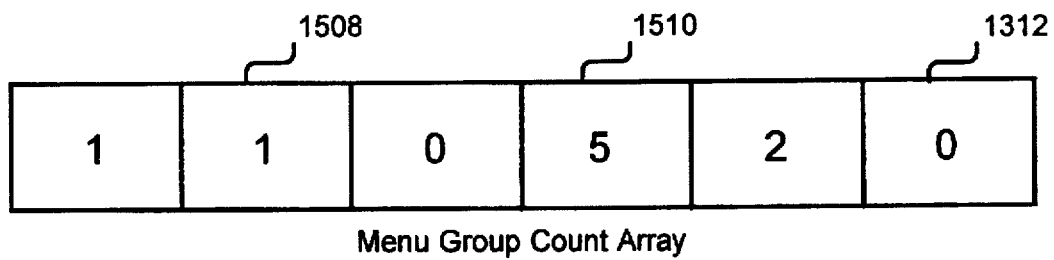
FIG. 15 illustrates the menu group count array after the sever application program has updated the menu group count array under the conflict resolution protocol.
Figure 16:
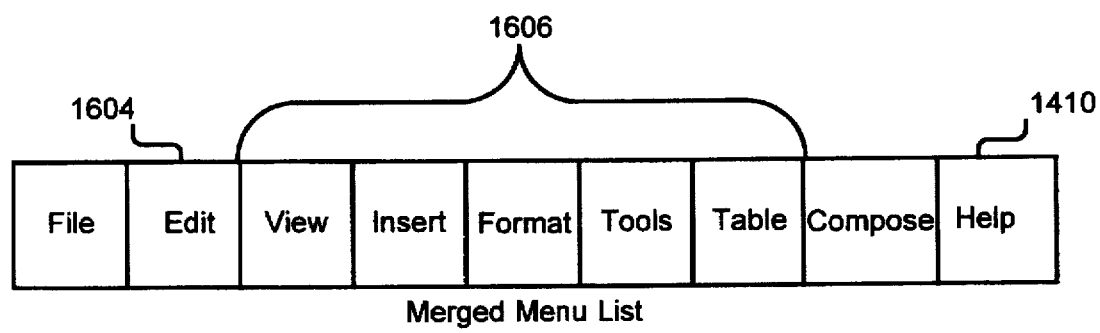
FIG. 16 illustrates the merged menu list after the server application program has inserted its server menus under the conflict resolution protocol.

The server application program then receives the menu group count array and the merged menu list from the container application program. The server application program inserts its server menus into the merged menu list and appropriately sets the counts in the menu group count array. FIG. 15 illustrates the menu group count array after the sever application program has updated the menu group count array. FIG. 16 illustrates the merged menu list after the server application program has inserted its server menus. The server application program has inserted an "Edit" menu 1604 into its Edit menu group and has added one into the second entry 1508 of the menu group count array. The server application also inserts "View," "Insert," "Format," "Tools," and "Table" menus 1606 into its Server menu group and adds five to the fourth entry 1510 of the menu group count array.

Before adding its "Help" menu to its Help menu group, the server application program determines whether or not the container application program supports the protocol for merging "Help" menus. If the container application program has entered a one into the last entry 1312 of the menu group count array, the server application program determines that the container application program supports the protocol and has added its "Help" menu as a container sub-menu of a "Help" combined menu in the merged menu list. If the container application program has not added a one in the last entry of the menu group count array, then the entry would contain a zero, and the server application program would determine that the container application program does not support the protocol for merging "Help" menus. When the container application program does not support the protocol, the server application program adds its own "Help" menu to the merged menu list. If the container application program has added a "Help" combined menu, then the server application program adds its own "Help" menu as a server sub-menu of the "Help" combined menu 1410. The server application program changes the last entry's count in the menu group count array to zero and increments the fifth entry's count of the menu group count array by one.

Figure 17:
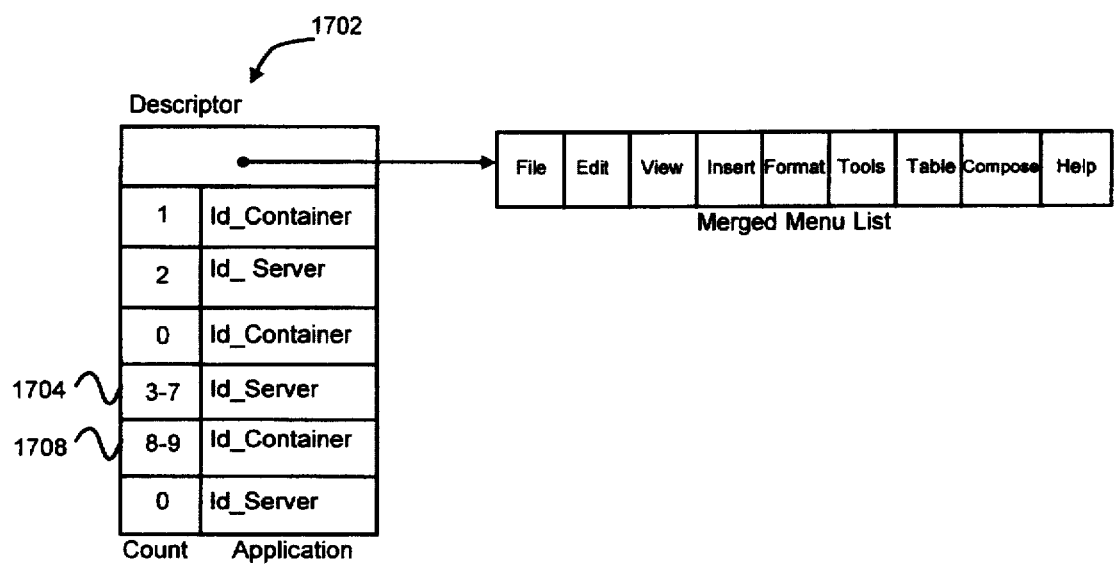
FIG. 17 illustrates a descriptor generated from the menu group count array of FIG. 15 and the merged menu list of FIG. 16.

Next the server application program calls the OleCreateDescriptor method in order to generate a descriptor. FIG. 17 illustrates a descriptor generated from the menu group count array of FIG. 15 and the merged menu list of FIG. 16. The descriptor's fifth entry 1708 contains the values eight through nine in its count field, and the fifth entry's application identifier field indicates that the container application program's window procedure processes window messages received for the eighth and ninth menus in the merged menu list. The ninth menu in the merged menu list is the "Help" combined menu, which contains the container sub-menu and the server sub-menu. After the merged menu list has been generated and displayed, if either the "Help" container sub-menu or the "Help" server sub-menu is selected, the operating system associates that sub-menu with the ninth menu, and, using the descriptor, the operating system determines that the menu selection window message should be forwarded to the container application program's window procedure.

Continuing with the CR protocol, the server application program then calls the SetMenu method of the IOleInPlaceFrame interface to have the container application program display the merged menu list. The container application program first determines whether the server application program supports the protocol for merging "Help" menus. If the server application program did not support the protocol, the server application program would have added its "Help" menu directly to the merged menu list, and the merged menu list would contain a "Help" menu and a "Help" combined menu. Otherwise, the server application program would have added its "Help" menu as a server sub-menu of the "Help" combined menu. If the container application program determines that the server application program did not follow the protocol for merging "Help" menus, then the container application program removes the "Help" combined menu and displays the merged menu list. Otherwise, the container application program, displays the merged menu list, which includes the "Help" combined menu. In addition, the container application program provides the correct dispatching code to the operating system for dispatching window messages.

When the merged menu list is displayed, if a user selects a menu, the menu items contained in that menu are displayed. FIG. 18 illustrates a user interface provided by a Microsoft Exchange application program which shows a merged menu list with a "Help" combined menu selected 1802. The "Exchange Help" menu item 1804 and "Word Help" menu item 1806 are displayed. An arrow to the right of a menu item indicates that the menu item is a sub-menu which contains other menu items. When a sub-menu is selected, the menu items contained in the sub-menu are displayed.

Figure 19:
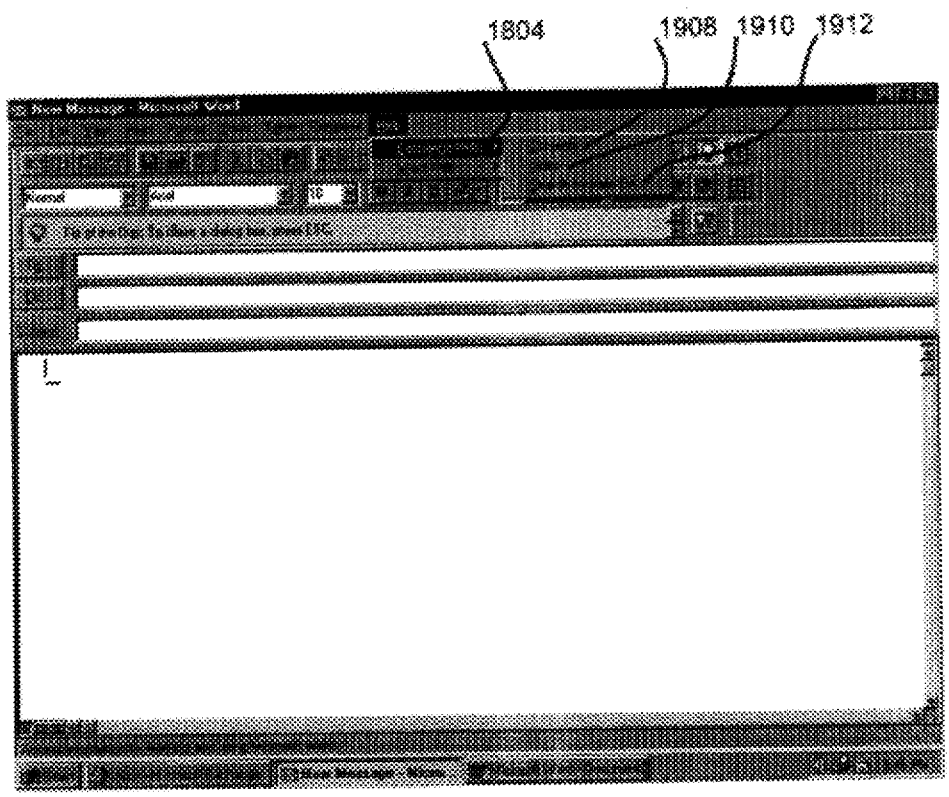
FIG. 19 illustrates a user interface when an "Exchange Help" sub-menu has been selected.
Figure 20:
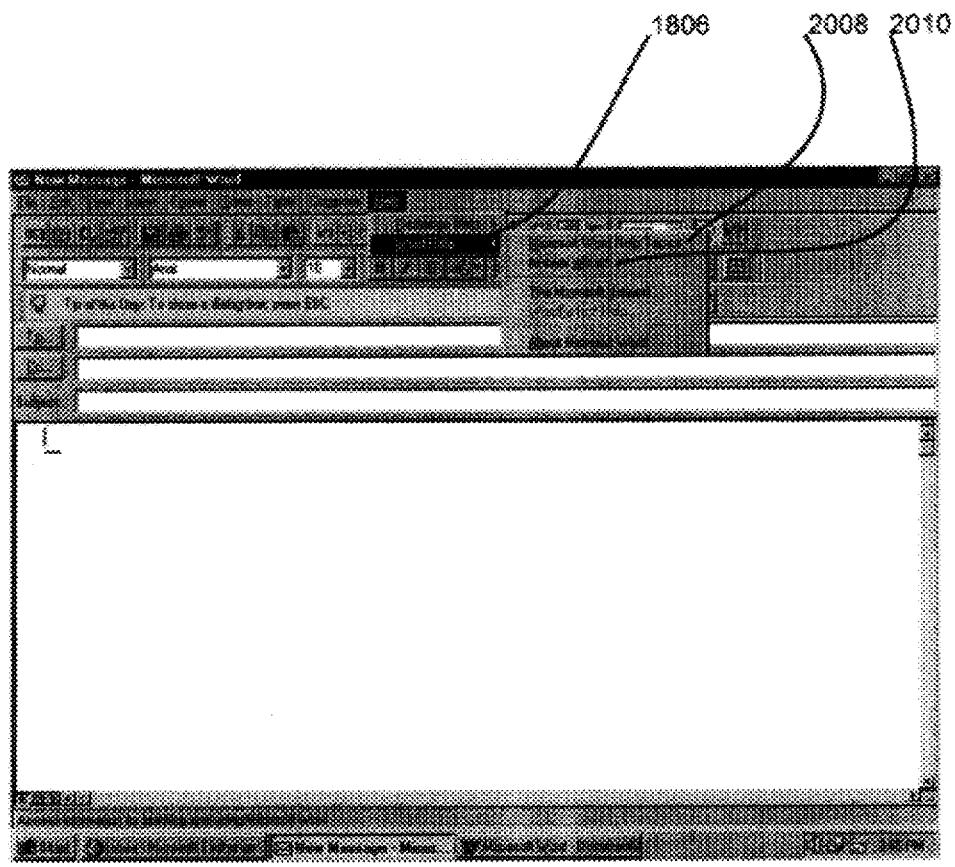
FIG. 20 illustrates a user interface when a "Word Help" sub-menu has been selected.

FIG. 19 illustrates a user interface when the "Exchange Help" sub-menu 1804 has been selected. The "Exchange Help" sub-menu contains the "Microsoft Contents" menu item 1908, the "Index" menu item 1910 and the "Search For Help On" menu item 1912. FIG. 20 illustrates a user interface when the "Word Help" sub-menu 1806 has been selected. When the "Word Help" sub-menu has been selected, the method displays the "Microsoft Word Help Topics" menu item 2008 and the "Answer Wizard" menu item 2010.

A user selects a menu or menu item by pointing to it with a mouse and then clicking a mouse button. The operating system recognizes the click of the mouse button as an event and translates this event into a window message. By using the descriptor, the operating system determines whether the container application program should process the window message or whether the server application program should process the window message. Then, the operating system places the message in the appropriate application program's message queue. The application program then retrieves the message and delivers the message to the appropriate window procedure.

If the "Help" menu is selected by a user, the operating system counts to that menu, which is nine, finds the entry 1708 in the descriptor which includes nine, and determines that the window message should be sent to the container application program's window procedure based on the application identifier. If the window message indicates that a server sub-menu has been selected, then the server application program's window procedure should process the window message. When the container application program's window procedure receives a window message which the server application program should process, it forwards the window message to the server application's window procedure.

For example, if a user selected the "Exchange Help" sub-menu illustrated in FIG. 18, then the operating system would determine that this is a menu item of the ninth menu in the merged menu list, which is a menu that is processed by the container application program. The operating system then places a window message in the container application program's window message queue. The container application program then delivers the window message to the appropriate window procedure, which processes the message. In particular, the window procedure determines whether the window message should be processed by this window procedure or by the server application program's window procedure. If the server application program's window procedure should process the message, the container application program's window procedure forwards the window message to the server application program's window procedure, otherwise it processes the window message.

After a merged menu list has been displayed, if a user, using an input device, requests that the server application program be closed, then the server application program removes the merged menu list. First, the server application program calls the SetMenu method of the IOleInPlaceFrame interface. The container application program then calls the OleSetMenuDescriptor method to remove its dispatching code. Then, the server application program calls the OleDestroyMenuDescriptor method to remove the descriptor data structure and free up system resources. The OleDestroyMenuDescriptor method is defined below:

TABLE 5

| void OleDestroyMenuDescriptor(holemenu) | | |
|---|---|---|
| Argument | Type | Description |
| holemenu | HOLEMENU | The handle to the descriptor that was returned by OleCreateMenuDescriptor. |
| return value | void | This function cannot indicate failure. |

The server application program calls the OleDestroyMenuDescriptor method with a handle to the descriptor in the holemenu argument. The OleDestroyMenuDescriptor method then destroys the descriptor and frees up system resources. Next, the server application program removes server menus. Then, the server application program calls the RemoveMenus method of the IOleInPlaceFrame interface, which is supported by the container application program, to tell the container application program to remove its menus. The RemoveMenus method is defined below:

TABLE 6

| HRESULT IOleInPlaceFrame::RemoveMenus(hmenu) | | |
|---|---|---|
| Argument | Type | Description |
| hmenu | HMENU | A handle to the merged menu list constructed by IOleInPlaceFrame::InsertMenus and the server application program's InsertMenus calls. |
| return value | HRESULT | S_OK if successful. Other values indicate RPC failures or Windows API failures. |

The server application program calls the RemoveMenus method with a handle to the merged menu list, identified by the hmenu argument. After the RemoveMenus method removes container menus, the RemoveMenus method returns an S_OK code if the method was successful, and otherwise the RemoveMenus method returns other codes indicating it was not successful. Finally, the server application program calls the DestroyMenu method, provided by the OLE environment, to remove the merged menu list and free up system resources.

Alternative Embodiment

In an alternative embodiment, an enhanced conflict resolution (ECR) protocol is provided which enables a server application program to add server menus to the container menu groups and enables the container application program to add container menus to the server menu groups. In addition, under the ECR protocol, the container application program and server application program determine whether the other application program supports the ECR protocol. When both the container and the server application programs support the ECR protocol, each application program may add menus to any menu group. When only one of the container or the server application programs supports the ECR protocol, the container and server application programs interact under the menu merging protocol. However, when one or both the container and server application programs do not support the ECR protocol but both support the CR protocol, the container and server application programs interact under the CR protocol.

Under the ECR protocol, the server application program adds a server menu to a container menu group of an empty merged menu list and updates the corresponding menu group count array. Then, the server application program forwards the merged menu list and menu group count array to the container application program. If the container application program supports the ECR protocol, the container application program adds a combined menu to the container menu group that contains the server menu. Then, the container application program transfers the server menu to be a sub-menu of the combined menu and adds the container menu items to the combined menu. Next, the container application program adds its remaining menus to the container menu groups and adds a container menu to a server menu group. The container application program also updates the menu group count array and forwards both the merged menu list and the menu group count array to the server application program.

Continuing with the ECR protocol, the server application program then determines whether the container application program supports the ECR protocol by determining whether its server menu is a sub-menu of a combined menu in a container menu group. When the container application program supports the ECR protocol, the server application program then determines whether the container application program has added a container menu to a server menu group. When the container application program has added a container menu to a server menu group, the server application program adds a combined menu to the server menu group that contains the container menu. The server application program then transfers the container menu to be a sub-menu of the combined menu and add its remaining menus to the server menu groups. The server application program also updates the menu group count array and forwards the merged menu list and menu group count array to the container application program for displaying.

On the other hand, when the server application program determines that the container application program does not support the ECR protocol, the server application program removes its server menu from the container menu group. Additionally, when the server application program determines that the container application program does not support the ECR protocol, if the server application program supports the CR protocol, the server application program determines whether the container application program supports the CR protocol. When, the container application program supports the CR protocol, the container and server application programs interact under the CR protocol, otherwise, they interact under the menu merging protocol. Also, when the server application program does not support the CR protocol, the container and server application programs interact under the menu merging protocol.

Moreover, when the server application program does not support the ECR protocol, but the container application program does, the container application program may add a container menu to a server menu group before forwarding the merged menu list to the server application program. However, upon receiving the merged menu list back from the server application program for displaying, the container application program detects that the server application program did transfer the container menu to be a sub-menu of a combined menu and removes the container menu from the server menu group before displaying the merged menu list.

Additionally, when the server application program adds a combined menu to the merged menu list, the server application program adds the container menu as a sub-menu which is sequentially placed after the server menu-items in the combined menu, because a user expects to see server menu-items upon selecting a server menu in a server menu group. Also, because a user is likely to use the server menu-items in a combined menu in a server menu group often, these are displayed as menu items in the combined menu. Similarly, when the container application program adds a combined menu to the merged menu list, the container application program adds the server menu as a sub-menu which is sequentially placed after the container menu-items in the combined menu.

Flow Diagrams

FIGS. 21 to 28 provide flow diagrams illustrating the steps performed by the menu merging protocol and the CR protocol.

Figure 21:
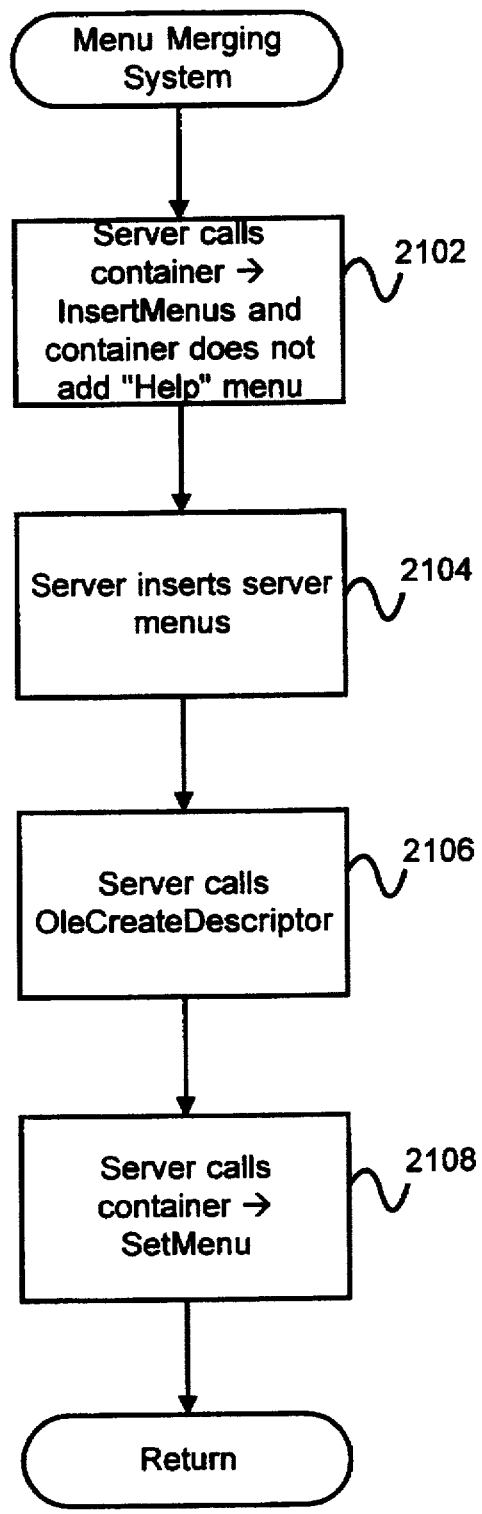
FIG. 21 provides an overview flow diagram illustrating a menu merging protocol procedure within an OLE environment.

FIG. 21 provides an overview flow diagram illustrating a typical menu merging protocol procedure within an OLE environment in the menu merging protocol procedure, the server application program first requests the container application program to add its menus to the merged menu list. The container application program adds its menus, except for its "Help" menu. Then the server application program adds its menus, including its "Help" menu. Next, the server application program generates a descriptor, and then the server application program requests the container application program to display the merged menu list. In step 2102, the server application program calls the container application program's InsertMenus method to have the container application program insert its menus into the merged menu list. In step 2104, the server application program inserts server menus into the merged menu list. In step 2106, the server application program calls the OleCreateDescriptor method to generate the descriptor. In step 2108, the server application program calls the container application programs SetMenu method to display the merged menu list.

Figure 22:
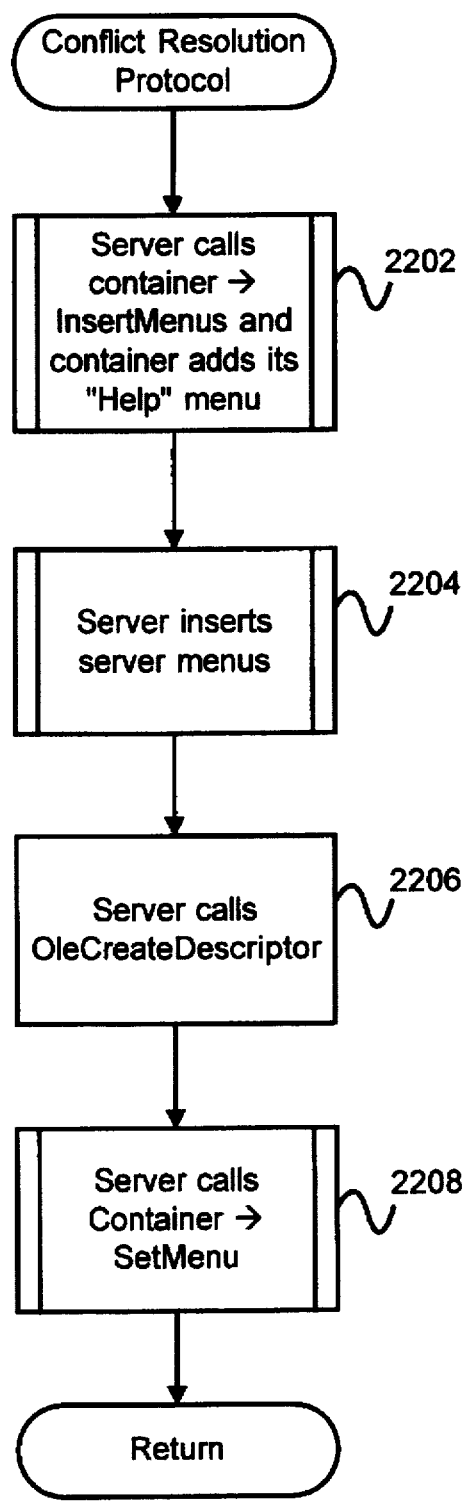
FIG. 22 provides an overview flow diagram illustrating a conflict resolution protocol procedure within an OLE environment that supports the menu merging protocol.

FIG. 22 provides an overview flow diagram illustrating the conflict resolution protocol procedure within an OLE environment that supports the menu merging protocol. In the conflict resolution protocol procedure, the server application program first requests the container application program to add its menus to the merged menu list. The container application program adds its menus to the merged menu list, adds a "Help" combined menu to the merged menu list, and adds its "Help" menu as a sub-menu of the "Help" combined menu. Then the server application program adds its menus to the merged menu list, adding its "Help" menu as a sub-menu of the "Help" combined menu. Next, the server application program generates a descriptor and then requests the container application program to display the merged menu list. In step 2202, the conflict resolution protocol procedure calls the container application program's Insert-Menus method to have the container application program insert its menus into the merged menu list. In step 2204, the conflict resolution protocol procedure inserts server menus into the merged menu list. In step 2206, the conflict resolution protocol procedure calls the OleCreateDescriptor method to generate the descriptor. In step 2208, the conflict resolution protocol procedure calls the container application program's SetMenu method.

Figure 23:
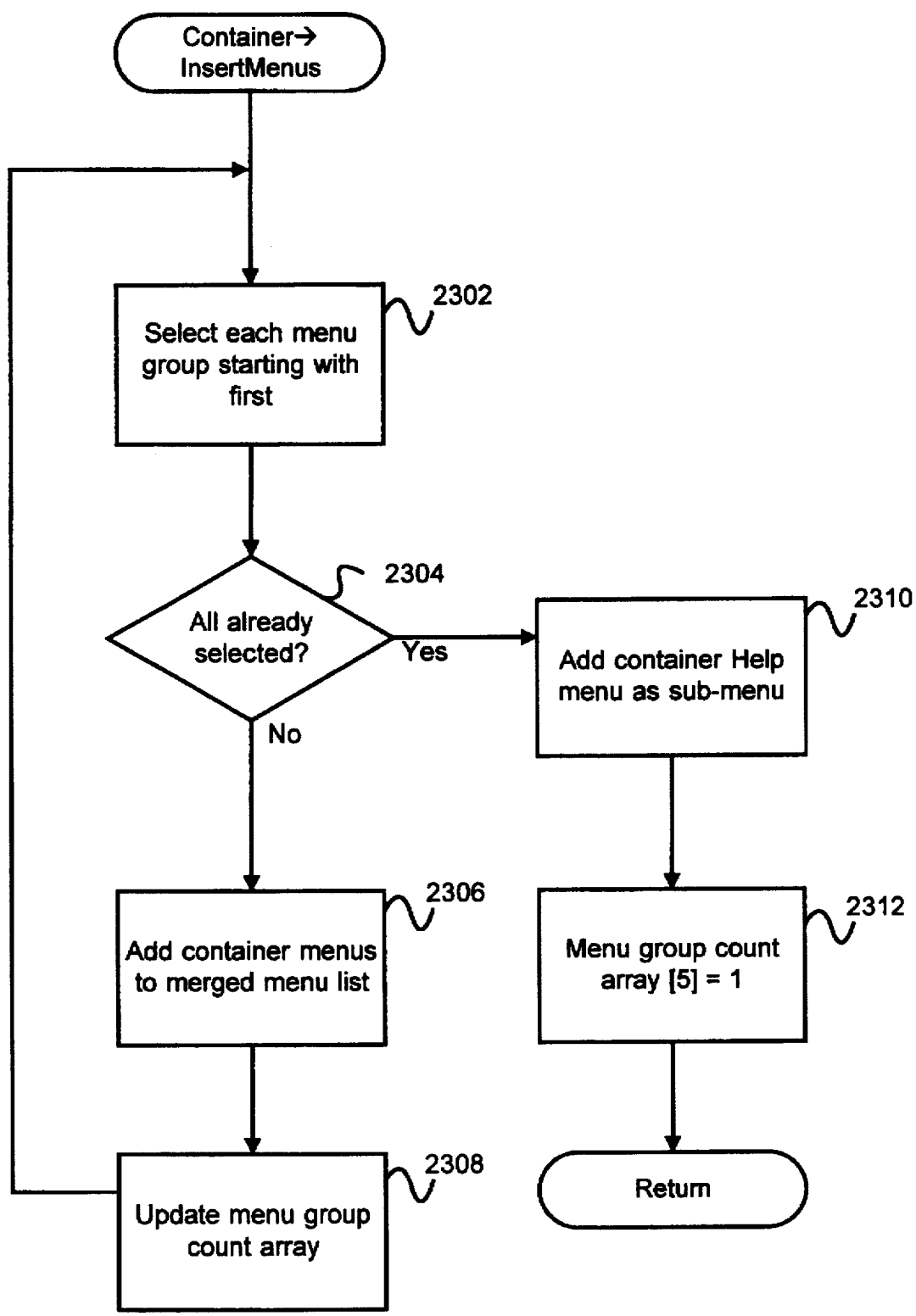
FIG. 23 illustrates a flow diagram of the container application program's insert menus procedure when the container application program supports the conflict resolution protocol.

FIG. 23 illustrates a flow diagram of the container application program's insert menus procedure when the container application program supports the CR protocol. In step 2302, the insert menus procedure selects each menu group starting with the first. In step 2304, if all of the menu groups have already been selected, the insert menus procedure continues at step 2310, else it continues at step 2306. In step 2306, the insert menus procedure adds container menus to the merged menu list. In step 2308, the insert menus procedure updates the menu group count array. Then the insert menus procedure loops back to step 2302 to process other menu groups. In step 2310, the insert menus procedure adds the container "Help" menu as a sub-menu of a combined menu. In step 2312, the insert menus procedure sets the menu group count array's last entry to one.

Figure 24:
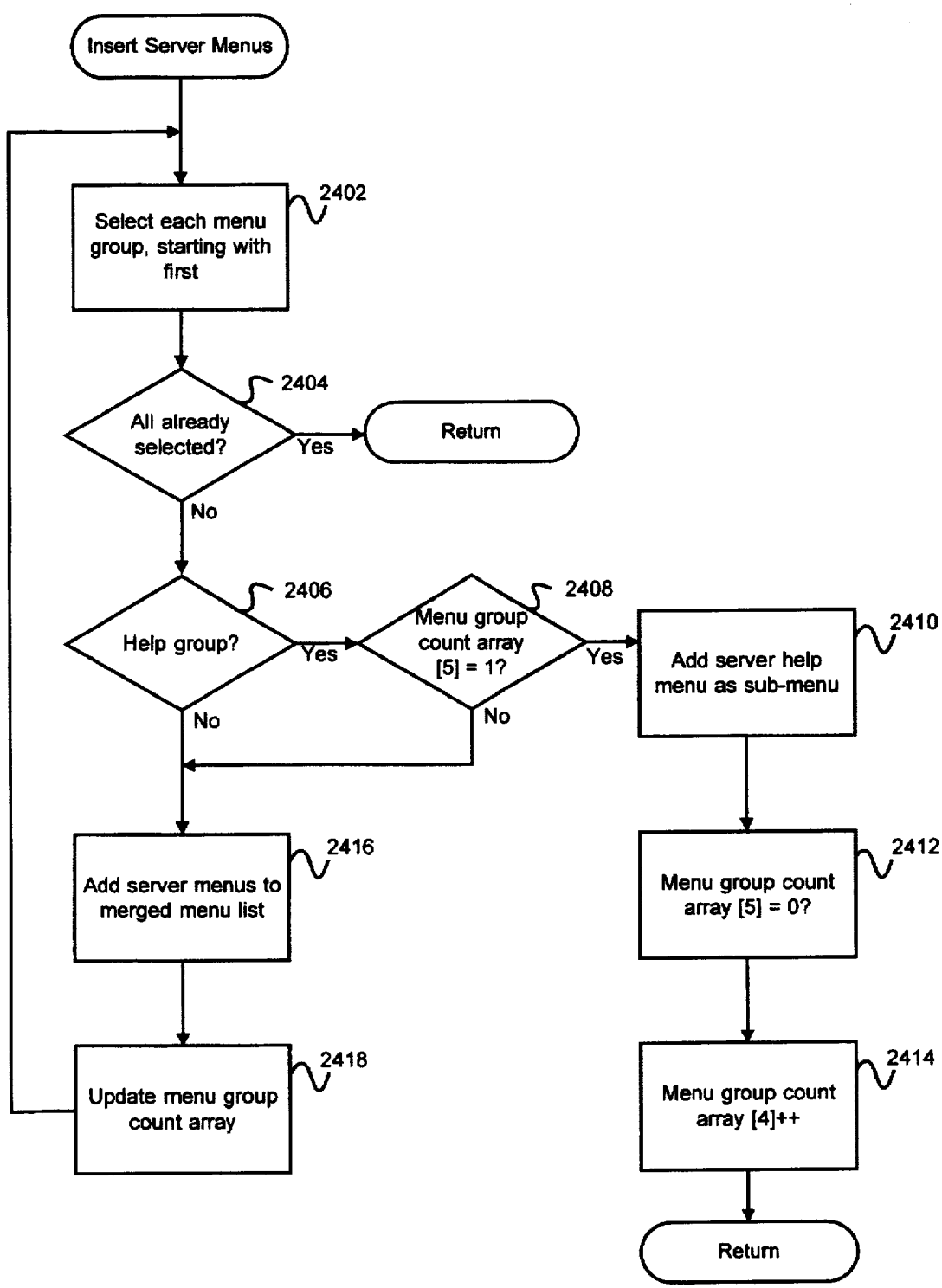
FIG. 24 illustrates a flow diagram of the insert server menus procedure when the server application program supports the conflict resolution protocol.

FIG. 24 illustrates a flow diagram of the insert server menus procedure when the server application program supports the CR protocol. In step 2402, the insert server menus procedure selects each menu group, starting with the first. In step 2404, if all of the menu groups have already been selected, then the insert server menus procedure returns, else the insert server menus procedure continues at step 2406. In step 2406, if the menu group is the help group, then the insert server menus procedure continues at step 2408, else the insert server menus procedure continues at step 2416. In step 2408, if the menu group count array's last entry is one, then the insert server menus procedure continues at step 2410, else the insert server menus procedure continues at step 2416. In step 2410, the insert server menus procedure adds the server "Help" menu as a sub-menu of the composite "Help" menu. In step 2412, the insert server menus procedures sets the last entry of the menu group count array to zero. In step 2414, the insert server menus procedure increments the fifth entry of the menu group count array by one. In step 2416, the insert server menus procedure adds server menus to merged menu list. In step 2418, the insert server menus procedure updates the menu group count array. Then the insert server menus procedure continues to loop to step 2402 in order to process the other menu groups.

Figure 25:
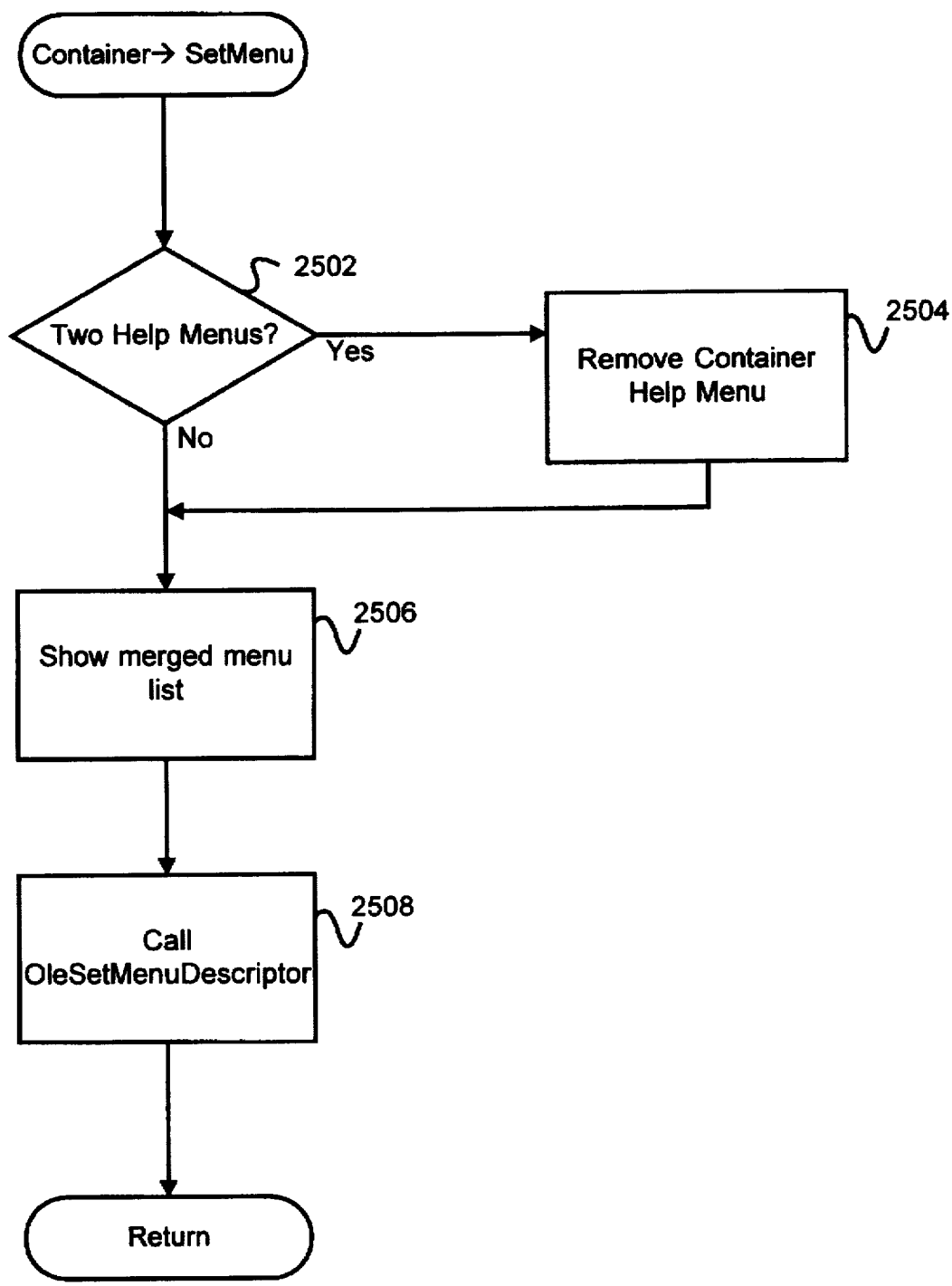
FIG. 25 illustrates a flow diagram of the container application program's set menu procedure when the container application program supports the conflict resolution protocol.

FIG. 25 illustrates a flow diagram of the container application program's set menu procedure when the container application program supports the CR protocol. Before displaying the merged menu list, the container application program determines whether the server application supports the CR protocol. When the server application program supports the CR protocol, the server application program adds its "Help" menu as a sub-menu of the "Help" combined menu. Otherwise, the server application program adds its "Help" menu to the merged menu list after the container application program has added a "Help" combined menu to the merged menu list, resulting in two "Help" menus in the merged menu list. In step 2502, if there are two "Help" menus in the merged menu list, then the set menu procedure continues at step 2504, else the set menu procedure continues at step 2506. In step 2504, the set menu procedure removes the container application program's "Help" menu. In step 2506, the set menu procedure displays the merged menu list. In step 2508, the set menu procedure calls the OleSetMenuDescriptor method.

Figure 26:
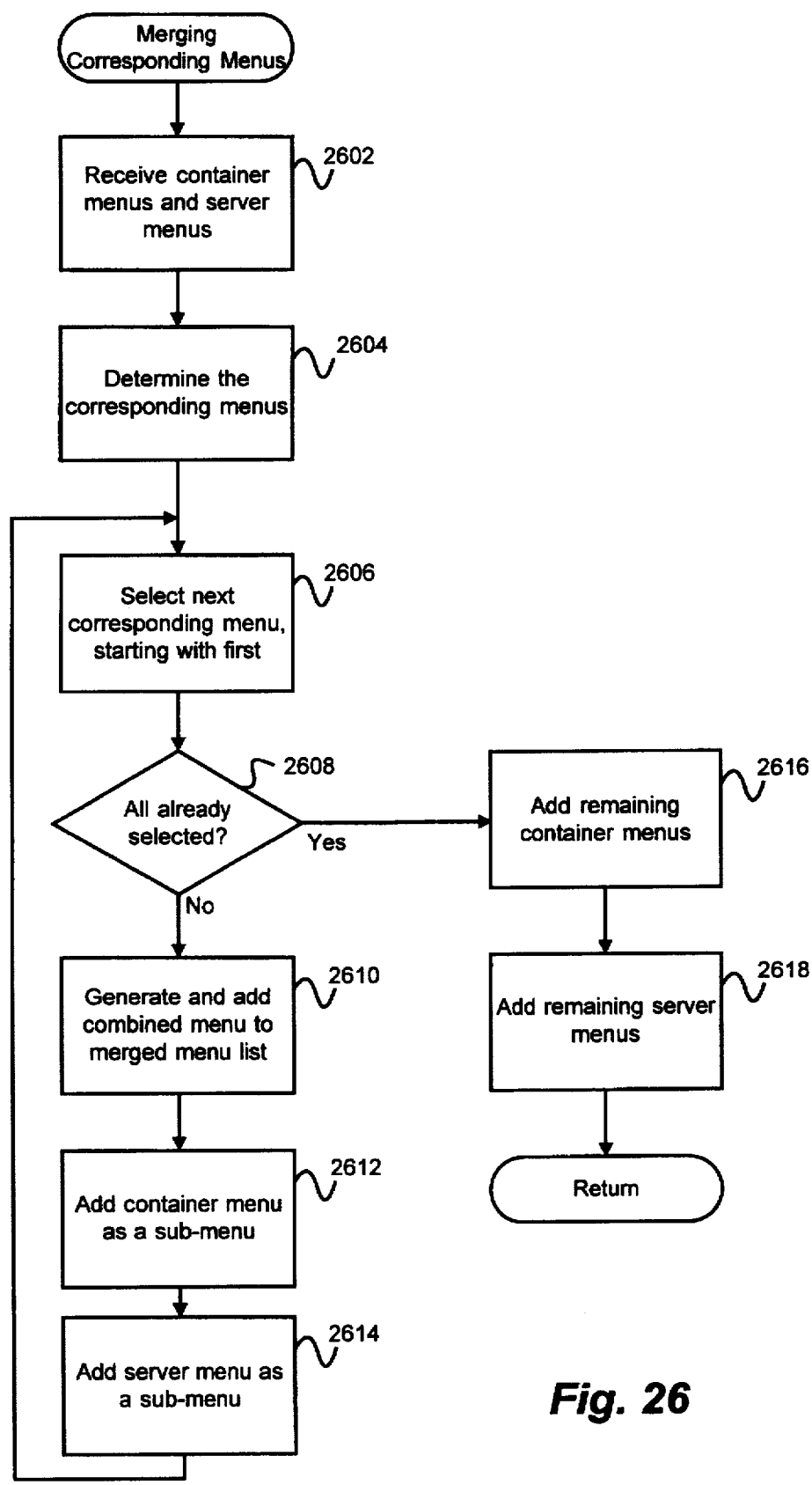
FIG. 26 is an overview flow diagram of the merging corresponding menus procedure.

FIG. 26 is an overview flow diagram of the merging corresponding menus procedure. The merging corresponding menus procedure provides a method for merging menus in an environment which does not support the menu merging protocol. The merging menus procedure first determines the corresponding menus from the container application program's menu list and a server application program's menu list. For each of the corresponding menus, the merging menus procedure generates a combined menu and adds the container and server menus as sub-menus to the combined menu. Then, the merging corresponding menus procedure adds the remaining container and server menus to the merged menu list. In step 2602, the merging corresponding menus procedure receives container menus and server menus. In step 2604, the merging corresponding menus procedure determines the corresponding menus. In step 2606, the merging corresponding menus procedure selects the next corresponding menu, starting with the first. In step 2608, if all of the corresponding menus have already been selected, the merging corresponding menus procedure continues at step 2616, else the merging corresponding menus procedure continues at step 2610. In step 2610, the merging corresponding menus procedure generates and adds a combined menu to the merged menu list. In step 2612, the merging corresponding menus procedure adds the container menu as a sub-menu of the combined menu. In step 2614, the merging corresponding menus procedure adds the server menu as a sub-menu of the combined menu. Then the merging corresponding menus procedure loops back to step 2606 to continue processing other corresponding menus. In step 2616, the merging corresponding menus procedure adds the remaining container menus. In step 2618, the merging corresponding menus procedure adds the remaining server menus.

Figure 27:
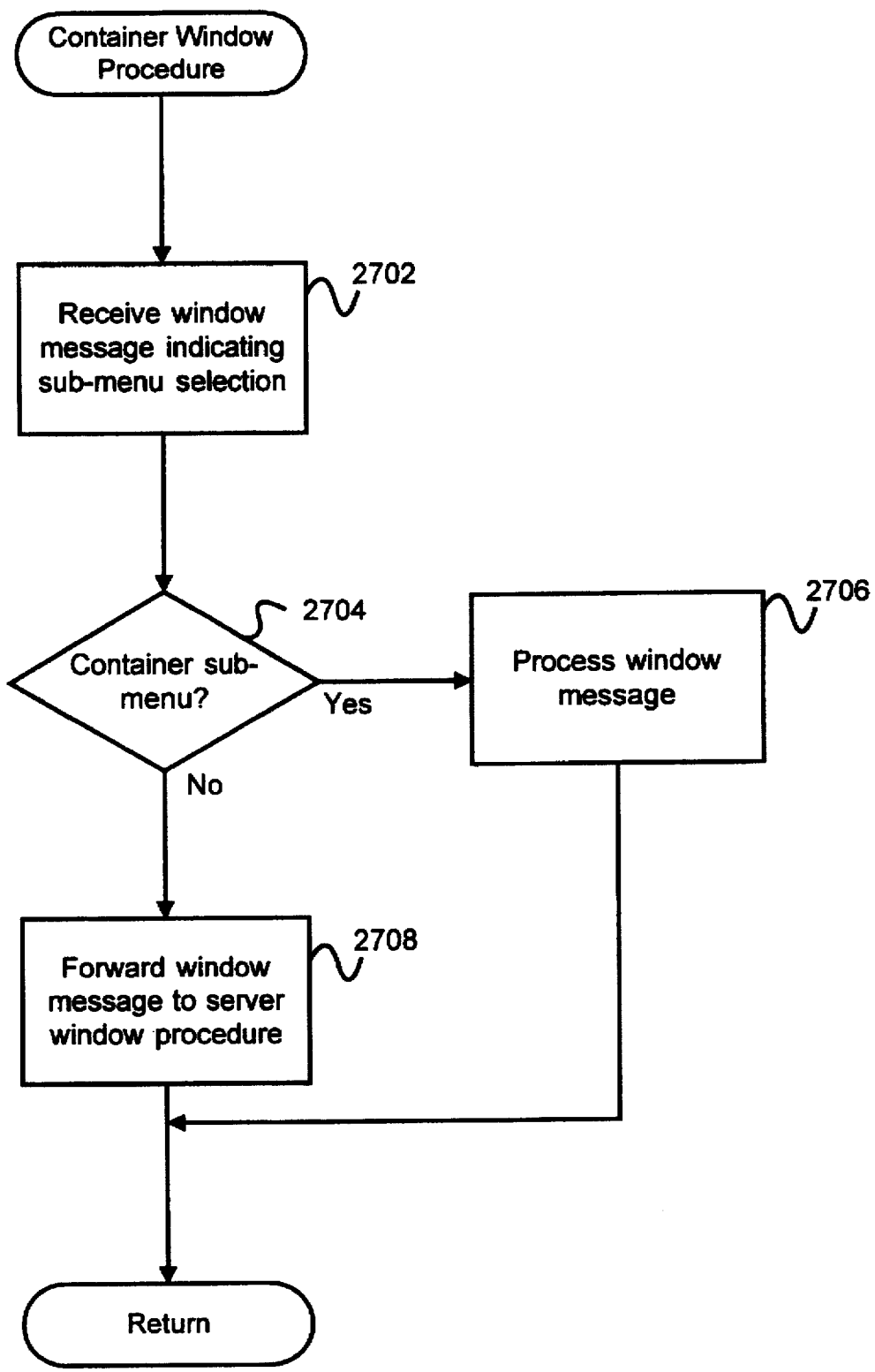
FIG. 27 illustrates an overview flow diagram of the container window procedure.

FIG. 27 illustrates an overview flow diagram of the container window procedure. In step 2702, the container window procedure receives a window message indicating that a sub-menu has been selected. In step 2704, if the sub-menu is a container sub-menu, then the container window procedure continues at step 2706, else the container window procedure continues at step 2708. In step 2706, the container window procedure processes the window message. In step 2708, the container window procedure forwards the window message to the server window procedure.

Figure 28:
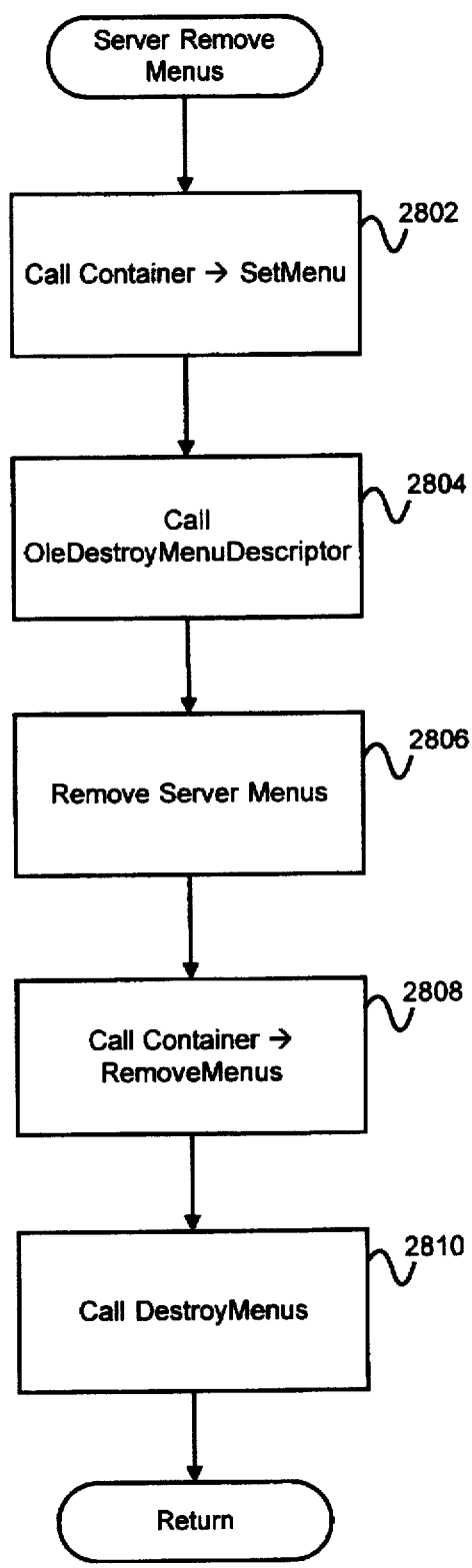
FIG. 28 illustrates an overview flow diagram of the server remove menus procedure.

FIG. 28 illustrates an overview flow diagram of the server remove menus procedure. In step 2802, the server remove menus procedure calls the container application program's SetMenu method. In step 2804, the server remove menus procedure calls the OleDestroyMenuDescriptor method. In step 2806, the server remove menus procedure removes the server menus. In step 2808, the server remove menus procedure calls the container application program's RemoveMenus method. In step 2810, the server remove menus procedure calls the DestroyMenu method.

Although the present invention has been described in terms of the preferred embodiment, it is not intended that the invention be limited to this embodiment. Modification within the spirit of the invention will be apparent to those skilled in the art. The scope of the present invention is defined by the claims which follow.

I claim:

1. A method in a computer system for generating a merged menu list for container menus of a container application and server menus of a server application, the container application having a container object and a container window environment, the server application having a containee object which is contained within the container object, the method comprising the computer-implemented steps of:

displaying the container window environment;

displaying the containee object within the displayed container window environment;

activating the displayed containee object; and in response to activating the displayed containee object, when a container menu corresponds to a server menu, generating a combined menu;

adding the generated combined menu to the merged menu list;

adding the container menu as a container sub-menu of the added combined menu in the merged menu list; and adding the server menu as a server sub-menu of the added combined menu in the merged menu list;

when a container menu does not correspond to any of the server menus, adding the container menu to the merged menu list;

when a server menu does not correspond to any of the container menus, adding the server menu to the merged menu list; and displaying the merged menu list, wherein when the combined menu is selected from the displayed merged menu list, displaying the container sub-menu of the combined menu and the server sub-menu of the combined menu; and when the displayed container sub-menu is selected, invoking the container application to process the container sub-menu, and when the server sub-menu is selected, invoking the server application to process the server sub-menu.

2. The method of claim 1 wherein, after displaying the container sub-menu of the combined menu and the server sub-menu of the combined menu, when the displayed container sub-menu or the displayed server sub-menu is selected, invoking the container application to process that sub-menu.

3. The method of claim 2 wherein, when the displayed container sub-menu is selected, the container application processes the container sub-menu.

4. The method of claim 2 wherein, when the displayed server sub-menu is selected, the container application invokes the server application to process the server sub-menu.

5. The method of claim 1 including, after the step of displaying the merged menu list, the step of removing the merged menu list.

6. A method in a computer system for merging a container menu of a container application with a server menu of a server application, the method comprising the computer-implemented steps of:

determining whether the container menu corresponds to the server menu;

when the container menu corresponds to the server menu, creating a combined menu;

adding the container menu as a sub-menu of the combined menu; and adding the server menu as a sub-menu of the combined menu.

7. The method of claim 6 wherein the container application has a container application name and the step of adding the container menu as a sub-menu of the combined menu further comprises generating a container sub-menu name for identifying the sub-menu based on the container application name.

8. The method of claim 6 wherein the server application has a server application name and the step of adding the server menu as a sub-menu of the combined menu further comprises generating a server sub-menu name for identifying the sub-menu based on the server application name.

9. The method of claim 6, further comprising:

displaying the combined menu;

in response to a user selecting the displayed combined menu, displaying the container sub-menu of the combined menu and the server sub-menu of the combined menu; and when the displayed container sub-menu is selected, invoking the container application to process the container sub-menu, and when the server sub-menu is selected, invoking the server application to process the server sub-menu.

10. A method in a computer system for merging a container menu of a container application and a server menu of a server application, the container application having a container object and a container window environment, the container application having an associated merged menu list, the server application having a containee object which is contained within the container object, the method comprising the computer-implemented steps of:

displaying the container window environment;

displaying the containee object within the displayed container window environment;

activating the displayed containee object; and in response to activating the displayed containee object, generating a combined menu and adding the generated combined menu to the merged menu list;

adding the container menu as a container sub-menu of the combined menu and the server menu as a server sub-menu of the combined menu in the merged menu list; and displaying the merged menu list.

11. The method of claim 10, further comprising:

in response to a user selecting the displayed combined menu in the displayed merged menu list, displaying the container sub-menu and the server sub-menu; and in response to the user selecting the container sub-menu or the server sub-menu, invoking the container application to process that sub-menu.

12. The method of claim 11 wherein, in response to a user selecting the displayed container sub-menu, invoking the container application to process the container sub-menu.

13. The method of claim 11 wherein, in response to a user selecting the displayed server sub-menu, the container application invoking the server application to process the server sub-menu.

14. A method in a computer system for merging container menus of a container application with server menus of a server application into a merged menu list, the merged menu list having container menu groups and server menu groups, the container application having a container object and a container window environment, the server application having a containee object which is contained within the container object, the computer system having a menu merging protocol for enabling the container application to add container menus to the container menu groups of the merged menu list and for enabling a server application to add server menus to the server menu groups of the merged menu list, wherein when a container menu corresponds to a server menu, the menu merging protocol allows the server application to add its corresponding server menu to the merged menu list but does not allow the container application to add its corresponding container menu to the merged menu list, the method comprising the computer-implemented steps of:

displaying the container window environment;

displaying the containee object within the displayed container window environment;

activating the displayed containee object; and in response to activating the displayed containee object,
requesting at the server application that the container application add container menus to the merged menu list;

under control of the container application,
generating a combined menu;
adding the generated combined menu to the merged menu list;
adding the corresponding container menu as a container sub-menu of the added combined menu; and
adding container menus other than the corresponding container menu to the merged menu list;

under control of the server application,
determining whether the container application added a combined menu to the merged menu list;
when it is determined that the container application added a combined menu to the merged menu list, adding the corresponding server menu as a server sub-menu of the added combined menu in the merged menu list;
when it is determined that the container application has not added a combined menu to the merged menu list, adding the corresponding server menu to the merged menu list; and
adding server menus other than the corresponding server menu to the merged menu list;

requesting at the server application that the container application display the merged menu list;

under control of the container application,
determining whether the server application added the corresponding server menu as a server sub-menu to the combined menu;
when it is determined that the server application has not added a corresponding server menu as a server sub-menu to the combined menu,
removing the combined menu from the merged menu list; and
displaying the merged menu list;
when it is determined that the server application has added a server menu as a server sub-menu to the combined menu, displaying the merged menu list; and installing dispatching code for processing a menu selection; and after displaying the merged menu list, when the combined menu is selected from the displayed merged menu list,
displaying the container sub-menu of the combined menu and the server sub-menu of the combined menu;
when the displayed container sub-menu is selected, invoking the container application to process the selected container sub-menu; and
when the displayed server sub-menu is selected, invoking the server application to process the selected server sub-menu.

15. The method of claim 14 wherein after the step of displaying the container sub-menu of the combined menu and the server sub-menu of the combined menu, when the displayed container sub-menu or the displayed server sub-menu is selected, invoking the container application to process that sub-menu.

16. The method of claim 15, further comprising:
when the displayed container sub-menu is selected, invoking the container application to process the container sub-menu; and
when the displayed server sub-menu is selected, the container application invoking the server application to process the server sub-menu.

17. A computer system for merging a container menu of a container application and a server menu of a server application, the container application having a container object and a container window environment, the container application having an associated merged menu list, the server application having a containee object which is contained within the container object, the system comprising:

means for displaying the container window environment;

means for displaying the containee object within the displayed container window environment;

means for activating the displayed containee object; and means for, in response to activating the displayed containee object,
generating a combined menu and adding the generated combined menu to the merged menu list;
adding the container menu as a container sub-menu of the combined menu in the merged menu list;
adding the server menu as a server sub-menu of the combined menu in the merged menu list; and
displaying the merged menu list.

18. The system of claim 17, further comprising:
when the displayed container sub-menu is selected, means for invoking the container application to process the container sub-menu; and
when the server sub-menu is selected, means for invoking the server application to process the server sub-menu.

19. The system of claim 17, further comprising, when the removal of the merged menu list is requested, removing the merged menu list.

20. A method in a computer system for generating a merged menu list for container menus of a container application and server menus of a server application, the merged menu list having container menu groups and server menu groups, the container menus having container menu items, the server menus having server menu items, the container application having a container object and a container window environment, the server application having a containee object which is contained within the container object, the method comprising the computer-implemented steps of:

displaying the container window environment;

displaying the containee object within the displayed container window environment;

activating the displayed containee object; and in response to activating the displayed containee object, when a container menu corresponds to a server menu, generating a combined menu;

determining whether to add the generated combined menu to one of the container menu groups or one of the server menu groups;

adding the generated combined menu to the determined one of the menu groups in the merged menu list;

when it is determined that the combined menu is to be added to one of the container menu groups, adding the container menu items in the container menu to the added combined menu in the merged menu list; and adding the server menu as a server sub-menu of the added combined menu in the merged menu list; and when it is determined that the combined menu is to be added to one of the server menu groups, adding the server menu items in the server menu to the added combined menu in the merged menu list; and adding the container menu as a container sub-menu of the added combined menu in the merged menu list.

21. The method of claim 20, further comprising:

displaying the merged menu list;

determining that the combined menu is selected from the displayed merged menu list; and when it is determined that the combined menu is selected from the displayed merged menu list, when the combined menu was added to one of the container menu groups, displaying the container menu items and the server sub-menu of the combined menu in the merged menu list;

when the combined menu was added to one of the server menu groups, displaying the server menu items and the container sub-menu of the combined menu in the merged menu list;

when the displayed container sub-menu or one of the container menu items is selected, invoking the container application to process the selection; and when the server sub-menu or one of the server menu items is selected, invoking the server application to process the selection.

* * * * *